United States Patent
Long

(10) Patent No.: US 9,736,872 B2
(45) Date of Patent: Aug. 15, 2017

(54) DATA TRANSMISSION METHOD, APPARATUS, AND SYSTEM

(71) Applicant: Huawei Device Co., Ltd., Shenzhen (CN)

(72) Inventor: Shuiping Long, Beijing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 104 days.

(21) Appl. No.: 14/793,141

(22) Filed: Jul. 7, 2015

(65) Prior Publication Data

US 2015/0319794 A1    Nov. 5, 2015

Related U.S. Application Data

(63) Continuation of application No. PCT/CN2014/076098, filed on Apr. 24, 2014.

(30) Foreign Application Priority Data

Apr. 28, 2013   (CN) .......................... 2013 1 0156346

(51) Int. Cl.
  *H04W 76/02*   (2009.01)
  *H04W 88/16*   (2009.01)
  (Continued)

(52) U.S. Cl.
  CPC ....... *H04W 76/021* (2013.01); *H04L 65/4084* (2013.01); *H04L 67/1063* (2013.01);
  (Continued)

(58) Field of Classification Search
  CPC ............. H04W 76/021; H04L 65/4084; H04L 67/1063; H04L 67/1089
  See application file for complete search history.

(56) References Cited

U.S. PATENT DOCUMENTS

| | | |
|---|---|---|
| 8,386,717 B1 | 2/2013 | Banerjee et al. |
| 2004/0156346 A1* | 8/2004 | O'Neill .................. H04L 29/06 370/338 |

(Continued)

FOREIGN PATENT DOCUMENTS

| | | |
|---|---|---|
| CN | 101459614 A | 6/2009 |
| CN | 101662504 A | 3/2010 |

(Continued)

OTHER PUBLICATIONS

Foreign Communication From a Counterpart Application, Korean Application No. 10-2015-7018562, Korean Office Action dated Apr. 13, 2016, 6 pages.

(Continued)

*Primary Examiner* — Albert T Chou
(74) *Attorney, Agent, or Firm* — Conley Rose, P.C.

(57) ABSTRACT

A data transmission method, apparatus, and system are provided that relate to the communications field and that reduce core network bandwidth resources occupied by data transmission. The method includes receiving, by a first base station, a request message sent by a first device, where the request message carries identification information of requested data and identification information of the first device, and the first device includes a user equipment or a second base station; retrieving, by the first base station, in stored data according to the identification information of the requested data; and when matched data is retrieved, sending, by the first base station, the matched data to the first device according to the identification information of the first device, where the matched data refers to data that matches the identification information of the requested data.

16 Claims, 13 Drawing Sheets

(51) Int. Cl.
*H04W 72/04* (2009.01)
*H04W 8/20* (2009.01)
*H04L 29/08* (2006.01)
*H04L 29/06* (2006.01)
*H04W 4/08* (2009.01)
*H04W 4/18* (2009.01)

(52) U.S. Cl.
CPC ...... *H04L 67/1089* (2013.01); *H04L 67/1093* (2013.01); *H04L 67/288* (2013.01); *H04L 67/2814* (2013.01); *H04L 67/2842* (2013.01); *H04W 4/08* (2013.01); *H04W 4/18* (2013.01); *H04W 8/20* (2013.01); *H04W 72/0406* (2013.01); *H04W 88/16* (2013.01)

(56) References Cited

U.S. PATENT DOCUMENTS

| | | | | |
|---|---|---|---|---|
| 2009/0298515 | A1* | 12/2009 | Czaja | H04L 7/041 455/456.5 |
| 2010/0002666 | A1* | 1/2010 | Mukai | H04L 63/105 370/338 |
| 2010/0197236 | A1 | 8/2010 | Kawamura | |
| 2010/0215024 | A1 | 8/2010 | Chiang | |
| 2011/0141887 | A1* | 6/2011 | Klein | H04W 4/00 370/230 |
| 2012/0136935 | A1 | 5/2012 | Tcha et al. | |
| 2013/0003708 | A1 | 1/2013 | Ko et al. | |
| 2013/0041943 | A1 | 2/2013 | Ozawa | |
| 2014/0185606 | A1 | 7/2014 | Wei | |

FOREIGN PATENT DOCUMENTS

| | | |
|---|---|---|
| CN | 101707684 A | 5/2010 |
| CN | 101925045 A | 12/2010 |
| CN | 102929958 A | 2/2013 |
| JP | 2010200305 A | 9/2010 |
| JP | 20130048385 A | 3/2013 |
| KR | 20100073154 A | 7/2010 |
| WO | 2011116819 A1 | 9/2011 |
| WO | 2011132662 A1 | 10/2011 |
| WO | 2011157120 A2 | 12/2011 |
| WO | 2012089510 A1 | 7/2012 |
| WO | 2012139016 A2 | 10/2012 |
| WO | 2013010451 A1 | 1/2013 |

OTHER PUBLICATIONS

Foreign Communication From a Counterpart Application, Korean Application No. 10-2015-7018562, English Translation of Korean Office Action dated Apr. 26, 2016, 9 pages.
Partial English Translation and Abstract of Japanese Patent Application No. JPA2013-048385, Nov. 11, 2016, 57 pages.
Foreign Communication From a Counterpart Application, Japanese Application No. 2015-560541, Japanese Office Action dated Sep. 12, 2016, 4 pages.
Foreign Communication From a Counterpart Application, Japanese Application No. 2015-560541, English Translation of Japanese Office Action dated Sep. 20, 2016, 5 pages.
Foreign Communication From a Counterpart Application, PCT Application No. PCT/CN2014/076098, English Translation of International Search Report dated Aug. 6, 2014, 2 pages.
Foreign Communication From a Counterpart Application, PCT Application No. PCT/CN2014/076098, Written Opinion dated Aug. 6, 2014, 5 pages.
Foreign Communication From a Counterpart Application, European Application No. 14791530.0, Extended European Search Report dated Feb. 19, 2016, 7 pages.
Machine Translation and Abstract of European Publication No. WO2011157120, Dec. 22, 2011, 23 pages.
Foreign Communication From A Counterpart Application, Chinese Application No. 201310156346.6, Chinese Office Action dated Apr. 5, 2017, 6 pages.

* cited by examiner

… (1) DATA TRANSMISSION METHOD, APPARATUS, AND SYSTEM

CROSS-REFERENCE TO RELATED APPLICATIONS

This application is a continuation of International Application No. PCT/CN2014/076098, filed on Apr. 24, 2014, which claims priority to Chinese Patent Application No. 201310156346.6, filed on Apr. 28, 2013, both of which are hereby incorporated by reference in their entireties.

TECHNICAL FIELD

The present invention relates to the communications field, and in particular, to a data transmission method, apparatus, and system.

BACKGROUND

With development of the mobile communications network, the mobile communications system gradually evolves to be broadband-based, flattened, and Internet Protocol (IP)-based, which provides better conditions for effective transmission of data and video services and improvement of application experience of a user. In the prior art, to reduce waste of bandwidth of a core network and an air interface, a video is transmitted in a HyperText Transport Protocol (HTTP) stream manner. In the HTTP stream manner, an encoding manner of video content is adjusted according to a status of a channel. If the channel is in a relatively good condition, video content at a relatively high data rate is transmitted; and if the channel is in a relatively poor condition, video content at a relatively low data rate is transmitted.

In a process of transmitting a video in an HTTP stream manner, when terminals of different users access same video content, a video server needs to separately send the same video content to the terminals of the different users. The transmitted video content repeatedly occupies the bandwidth of the core network, and an effect of reducing waste of the bandwidth of the core network is not obvious.

SUMMARY

Embodiments of the present invention provide a data transmission method, apparatus, and system, to reduce core network bandwidth resources occupied by data transmission.

To achieve the foregoing objective, the following technical solutions are used in the embodiments of the present invention.

According to a first aspect, an embodiment of the present invention provides a data transmission method, including receiving, by a first base station, a request message sent by a first device, where the request message carries identification information of requested data and identification information of the first device, and the first device includes a user equipment or a second base station; retrieving, by the first base station, in stored data according to the identification information of the requested data; and when matched data is retrieved, sending, by the first base station, the matched data to the first device according to the identification information of the first device, where the matched data refers to data that matches the identification information of the requested data.

In a first possible implementation manner of the first aspect, the method further includes, when no matched data is retrieved by the first base station and the first base station is not a cluster head, sending, by the first base station, the request message to a packet data network gateway through a mobility management entity, so that the packet data network gateway sends the request message to a third base station used as a cluster head, and the third base station determines, according to the identification information of the requested data, a first storage device on which the matched data is stored, and sends identification information of the first storage device to the first base station; receiving, by the first base station, the identification information of the first storage device; sending, by the first base station, the request message to the first storage device according to the identification information of the first storage device, so that the first storage device sends, after receiving the request message, the stored matched data that matches the identification information, in the request message, of the requested data to the first base station; and receiving, by the first base station, the matched data sent by the first storage device, and sending the matched data to the first device.

With reference to the first aspect, in a second possible implementation manner, the method further includes, when no matched data is retrieved by the first base station and the first base station is a cluster head, determining, by the first base station according to the identification information of the requested data, a second storage device on which the matched data is stored, and acquiring identification information of the second storage device; sending, by the first base station, the request message to the second storage device according to the identification information of the second storage device, so that the second storage device acquires the matched data according to the identification information of the requested data and sends the matched data to the first base station; receiving, by the first base station, the matched data sent by the second storage device; and sending, by the first base station, the matched data to the first device.

With reference to the first aspect, in a third possible implementation manner, the method further includes, when no matched data is retrieved by the first base station and the first base station is a cluster head, determining, by the first base station according to the identification information of the requested data, a third storage device on which the matched data that matches the identification information of the requested data is stored, and acquiring identification information of the third storage device; and sending, by the first base station, the identification information of the third storage device to the first device, so that the first device acquires the matched data from the third storage device according to the identification information of the third storage device.

With reference to the first possible implementation manner of the first aspect or the second possible implementation manner of the first aspect or the third possible implementation manner of the first aspect, in a fourth possible implementation manner, after the receiving, by a first base station, a request message sent by a first device, the method further includes determining, by the first base station, the number of times the request message is received; when it is determined that the number of times the request message is received is greater than a first threshold, acquiring, by the first base station, a maximum number of copies allowed in copying the matched data in a cluster and the number of times the matched data is already stored in the cluster; and when the number of times the matched data is already stored in the cluster is less than the maximum number of copies allowed in copying the matched data in the cluster, storing, by the first base station, the matched data, and updating the number of times the matched data is already stored in the cluster.

With reference to the fourth possible implementation manner of the first aspect, in a fifth possible implementation manner, the acquiring, by the first base station, a maximum number of copies allowed in copying the matched data in a cluster and the number of times the matched data is already stored in the cluster includes, if the first base station is not a cluster head, acquiring, by the first base station by using a cluster head, the maximum number of copies allowed in copying the matched data in the cluster and the number of times the matched data is already stored in the cluster; and after the updating, by the first base station, the number of times the matched data is already stored in the cluster, the method further includes sending, by the first base station to the cluster head, the updated number of times the matched data is already stored in the cluster, so that the cluster head updates the number of times the matched data is already stored in the cluster.

With reference to the fourth possible implementation manner of the first aspect or the fifth possible implementation manner of the first aspect, in a sixth possible implementation manner, the storing, by the first base station, the matched data includes determining, by the first base station, whether a size of free storage space is greater than a size of the matched data; if the size of the free storage space is greater than the size of the matched data, directly storing, by the first base station, the matched data; and if the size of the free storage space is not greater than the size of the matched data, updating, by the first base station, the free storage space according to a least recently used algorithm, and storing the matched data in the updated free storage space.

According to a second aspect, an embodiment of the present invention provides a data transmission method, including sending, by a user equipment, a request message to a first base station, where the request message carries identification information of requested data and identification information of the user equipment, so that the first base station retrieves in stored data on the first base station according to the identification information of the requested data; and if matched data is stored on and retrieved from the first base station, directly sending, by the first base station, the matched data to the user equipment, where the matched data refers to data that matches the identification information of the requested data; and receiving, by the user equipment, a response message sent by the first base station in response to the request message, and performing corresponding processing according to the response message.

In a first possible implementation manner of the second aspect, the response message includes the matched data; and the receiving, by the user equipment, a response message sent by the first base station in response to the request message, and performing corresponding processing according to the response message includes receiving, by the user equipment, the matched data sent by the first base station, and performing the corresponding processing according to the matched data.

With reference to the second aspect, in a second possible implementation manner, the response message in response to the request message includes identification information of a third storage device on which the matched data is stored; and the receiving, by the user equipment, a response message sent by the first base station in response to the request message, and performing corresponding processing according to the response message includes receiving, by the user equipment, the identification information, sent by the first base station, of the third storage device on which the matched data is stored; and acquiring, by the user equipment, the matched data from the third storage device according to the identification information of the third storage device.

With reference to the second aspect or the first possible implementation manner of the second aspect or the second possible implementation manner of the second aspect, in a third possible implementation manner, after the sending, by a user equipment, a request message to a first base station, the method further includes determining, by the user equipment, the number of times the request message is sent to the first base station; when it is determined that the number of times the request message is sent to the first base station is greater than a first threshold, acquiring, by the user equipment and from a cluster head, a maximum number of copies allowed in copying the matched data in a cluster and the number of times the matched data is already stored in the cluster; if the number of times the matched data is already stored in the cluster is less than the maximum number of copies allowed in copying the matched data in the cluster, storing, by the user equipment, the matched data, and updating the number of times the matched data is already stored in the cluster; and sending, by the user equipment to the cluster head, the updated number of times the matched data is already stored in the cluster, so that the cluster head updates the number of times the matched data is already stored in the cluster.

According to a third aspect, an embodiment of the present invention provides a base station, including a transceiver unit configured to receive a request message sent by a first device, where the request message carries identification information of requested data and identification information of the first device, and the first device includes a user equipment or a second base station; a retrieving unit configured to retrieve in stored data according to the identification information, received by the transceiver unit, of the requested data; and a processing unit configured to, when matched data is retrieved by the retrieving unit, trigger the transceiver unit to send, according to the identification information of the first device, the matched data to the first device, where the matched data refers to data that matches the identification information of the requested data.

In a first possible implementation manner of the third aspect, the processing unit is further configured to, when no matched data is retrieved by the retrieving unit and the base station is not a cluster head, trigger the transceiver unit to send the request message to a packet data network gateway through a mobility management entity, so that the packet data network gateway sends the request message to a third base station used as a cluster head, and the third base station determines, according to the identification information of the requested data, a first storage device on which the matched data is stored, and sends identification information of the first storage device to the first base station; the transceiver unit is further configured to receive the identification information of the first storage device; the transceiver unit is further configured to send the request message to the first storage device according to the identification information of the first storage device, so that the first storage device sends, after receiving the request message, the stored matched data that matches the identification information, in the request message, of the requested data to the base station; and the transceiver unit is further configured to receive the matched data sent by the first storage device, and send the matched data to the first device.

With reference to the third aspect, in a second possible implementation manner, the processing unit is further configured to, when no matched data is retrieved by the retrieving unit and the base station is a cluster head, determine, according to the identification information of the requested data, a second storage device on which the matched data is stored, and acquire identification information of the second storage device; the transceiver unit is further configured to send the request message to the second storage device according to the identification information, acquired by the processing unit, of the second storage device, so that the second storage device acquires the matched data according to the identification information of the requested data and sends the matched data to the base station; the transceiver unit is further configured to receive the matched data sent by the second storage device; and the transceiver unit is further configured to send the matched data to the first device.

With reference to the third aspect, in a third possible implementation manner, the processing unit is further configured to, when no matched data is retrieved by the retrieving unit and the base station is a cluster head, determine, according to the identification information of the requested data, a third storage device on which the matched data that matches the identification information of the requested data is stored, and acquire identification information of the third storage device; and the transceiver unit is further configured to send the identification information, acquired by the processing unit to the first device, of the third storage device, so that the first device acquires the matched data from the third storage device according to the identification information of the third storage device.

With reference to the first possible implementation manner of the third aspect or the second possible implementation manner of the third aspect or the third possible implementation manner of the third aspect, in a fourth possible implementation manner, the base station further includes a determining unit configured to determine the number of times the request message is received; where the processing unit is further configured to, when it is determined that the number of times the request message is received is greater than a first threshold, acquire a maximum number of copies allowed in copying the matched data in a cluster and the number of times the matched data is already stored in the cluster; and the processing unit is further configured to, when the number of times the matched data is already stored in the cluster is less than the maximum number of copies allowed in copying the matched data in the cluster, store the matched data, and update the number of times the matched data is already stored in the cluster.

With reference to the fourth possible implementation manner of the third aspect, in a fifth possible implementation manner, the processing unit is further configured to, when the base station is not a cluster head, acquire, by using a cluster head, the maximum number of copies allowed in copying the matched data in the cluster and the number of times the matched data is already stored in the cluster; and the transceiver unit is further configured to send, to the cluster head, the number of times the matched data is already stored in the cluster, where the number of times is updated by the processing unit, so that the cluster head updates the number of times the matched data is already stored in the cluster.

With reference to the fourth possible implementation manner of the third aspect or the fifth possible implementation manner of the third aspect, in a sixth possible implementation manner, the determining unit is further configured to determine whether a size of free storage space is greater than a size of the matched data; the processing unit is further configured to directly store the matched data when the determining unit determines that the size of the free storage space is greater than the size of the matched data; and when the determining unit determines that the size of the free storage space is not greater than the size of the matched data, update the free storage space according to a least recently used algorithm, and store the matched data in the updated free storage space.

According to a fourth aspect, an embodiment of the present invention provides a user equipment, including a transceiver unit configured to send a request message to a first base station, where the request message carries identification information of requested data and identification information of the user equipment, so that the first base station retrieves in stored data on the first base station according to the identification information of the requested data; and if matched data is stored on and retrieved from the first base station, the first base station directly sends the matched data to the user equipment, where the matched data refers to data that matches the identification information of the requested data; where the transceiver unit is further configured to receive a response message sent by the first base station in response to the request message; and a processing unit configured to perform corresponding processing according to the response message received by the transceiver unit.

In a first possible implementation manner of the fourth aspect, the response message includes the matched data; the transceiver unit is configured to receive the matched data sent by the first base station; and the processing unit is configured to perform the corresponding processing according to the matched data received by the transceiver unit.

With reference to the fourth aspect, in a second possible implementation manner, the response message includes identification information of a third storage device on which the matched data is stored; the transceiver unit is configured to receive the identification information, sent by the first base station, of the third storage device on which the matched data is stored; and the processing unit is configured to acquire the matched data from the third storage device according to the identification information, received by the transceiver unit, of the third storage device.

With reference to the fourth aspect or the first possible implementation manner of the fourth aspect or the second possible implementation manner of the fourth aspect, in a third possible implementation manner, the user equipment further includes a determining unit configured to determine the number of times the request message is sent to the first base station; where the processing unit is further configured to, when it is determined that the number of times the request message is sent to the first base station is greater than a first threshold, acquire, from a cluster head, a maximum number of copies allowed in copying the matched data in a cluster and the number of times the matched data is already stored in the cluster; the processing unit is further configured to, when the number of times the matched data is already stored in the cluster is less than the maximum number of copies allowed in copying the matched data in the cluster, store the matched data, and update the number of times the matched data is already stored in the cluster; and the transceiver unit is further configured to send, to the cluster head, the number of times the matched data is already stored in the cluster, where the number of times is updated by the processing unit, so that the cluster head updates the number of times the matched data is already stored in the cluster.

According to a fifth aspect, an embodiment of the present invention provides a data transmission system, including a mobility management entity, a packet data network gateway, at least one base station, and at least one user equipment, where the base station is the base station described in the foregoing embodiment, and the user equipment is the user equipment described in the foregoing embodiment.

Embodiments of the present invention provide a data transmission method, apparatus, and system. After receiving a request message sent by a first device, a first base station retrieves in stored data according to identification information, in the request message, of requested data; and if matched data exists on the first base station, the first base station directly sends the matched data to the first device. In this way, data is stored on a base station side, and therefore, when different user equipments served by a base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience.

BRIEF DESCRIPTION OF THE DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. The described embodiments are merely some rather than all of the embodiments of the present invention. All other embodiments obtained by a person of ordinary skill in the art based on the embodiments of the present invention without creative efforts shall fall within the protection scope of the present invention.

The following describes a data transmission method, apparatus, and system in the embodiments of the present invention in detail with reference to accompanying drawings.

Figure 1:
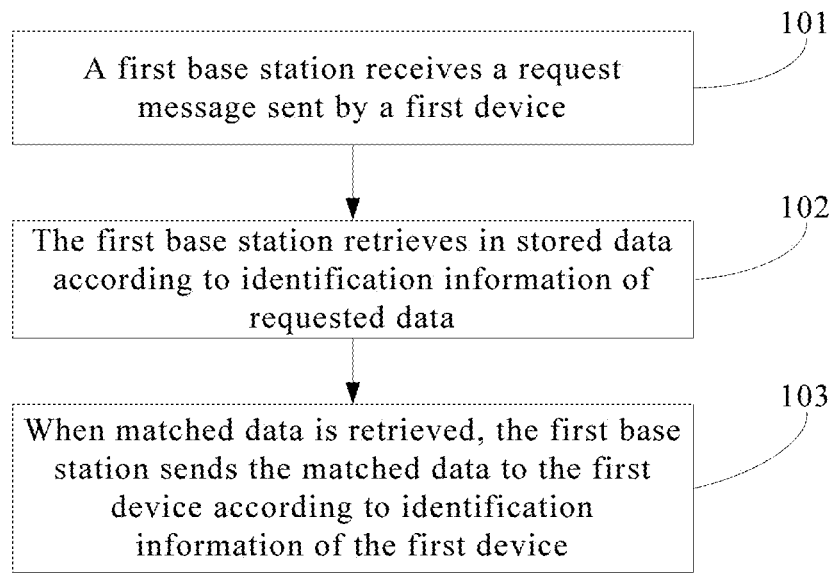
FIG. 1 is a schematic diagram of a data transmission method according to an embodiment of the present invention.

As shown in FIG. 1, an embodiment of the present invention provides a data transmission method, and the method includes the following steps.

101. A first base station receives a request message sent by a first device.

The request message carries identification information of requested data and identification information of the first device. The first device includes a User Equipment (UE) or a second base station.

When the UE needs to acquire data, the UE sends a request message to the first base station of the UE, and in this case, the first base station may receive the request message sent by the UE. The first device herein is the UE.

Data is stored on the first base station. If requested data that the UE needs to acquire exists in the stored data but the requested data is not stored on a second base station, the second base station may send a request message to the first base station. In this case, the second base station is a request base station of the first base station. The first device herein is the second base station.

It should be noted that the first base station and the first device are in a same cluster.

It should be noted that the data stored on the first base station is only accessible to a first device in the same cluster.

It should be noted that, in the embodiment of the present invention, a cluster includes at least one base station that stores data, and a UE served by the at least one base station.

102. The first base station retrieves in stored data according to the identification information of the requested data.

Data is stored on the first base station. After the request message is received, because the request message carries the identification information of the requested data, the first base station retrieves in the stored data according to the identification information, in the request message, of the requested data. That is, the first base station checks, according to the identification information of the requested data, whether identification information of the stored data is the same as the identification information of the requested data; if they are the same, it indicates that matched data is stored on the first base station; if they are different, it indicates that matched data is not stored on the first base station.

The first base station may use the following method to store the data: after the first base station receives a request message, the first base station first determines the number of times the request message is received, that is, the first base station counts a total number of times the request message is received. The first base station determines whether the acquired number of times the request message is received is greater than a first threshold; when it is determined that the number of times the request message is received is greater than the first threshold, the first base station acquires a maximum number of copies allowed in copying the matched data in a cluster and the number of times the matched data is already stored in the cluster; and when the number of times the matched data is already stored in the cluster is less than the maximum number of copies allowed in copying the matched data in the cluster, the first base station stores the matched data, and updates the number of times the matched data is already stored in the cluster.

It should be noted that the data stored on the first base station may be complete data content that is stored, or may be partial data content that is stored, and the present invention sets no limitation thereto.

Exemplarily, if the UE sends a request message to the first base station and the sent request message is a video request message, and in this case, the video request message carries identification information of a requested video, such as, an Identity (ID) of the video. After receiving the video request message, the first base station searches stored video information according to the identification information, in the video request message, of the requested video.

103. When matched data is retrieved, the first base station sends the matched data to the first device according to the identification information of the first device.

The matched data refers to data that matches the identification information of the requested data.

The first base station retrieves in the stored data according to the identification information, in the request message, of the requested data; and if the matched data is retrieved, sends the matched data to the first device. That is, in step 101, if receiving the request message sent by the UE, the first base station sends the matched data to the UE; if receiving the request message sent by the second base station, the first base station sends the matched data to the second base station.

This embodiment of the present invention provides a data transmission method. After receiving a request message sent by a first device, a first base station retrieves in stored data according to identification information, in the request message, of requested data; and if matched data exists on the first base station, the base station directly sends the matched data to the first device. In this way, data is stored on a base station side, and therefore, when different user equipments served by a base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience.

Figure 2:
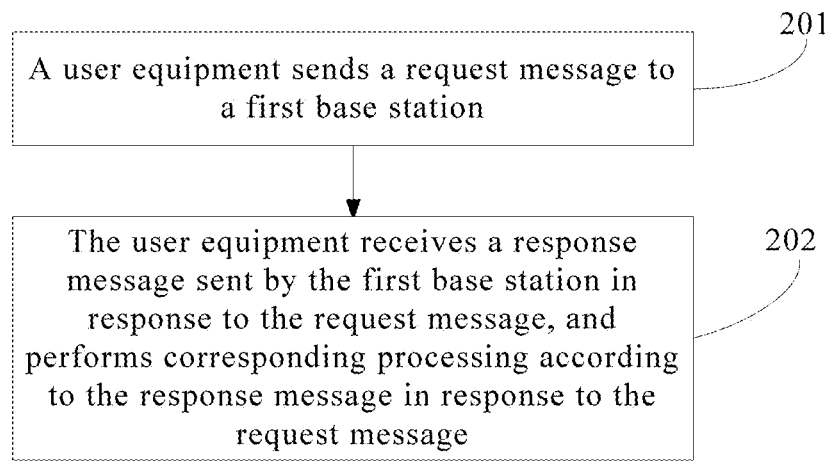
FIG. 2 is a schematic diagram of another data transmission method according to an embodiment of the present invention.

As shown in FIG. 2, an embodiment of the present invention provides a data transmission method, and the method includes the following steps.

201. A user equipment sends a request message to a first base station.

The request message carries identification information of requested data and identification information of the user equipment, so that the first base station retrieves in stored data on the first base station according to the identification information of the requested data; and if matched data is stored on and retrieved from the first base station, the first base station directly sends the matched data to the user equipment.

The matched data refers to data that matches the identification information of the requested data.

When sending the request message to the first base station, the user equipment adds identification information of data information that needs to be acquired to the request message, and sends the request message to the first base station.

202. The user equipment receives a response message sent by the first base station in response to the request message, and performs corresponding processing according to the response message.

The response message sent by the first base station includes the matched data. In this case, the user equipment receives the matched data sent by the first base station, and performs the corresponding processing according to the matched data.

The response message in response to the request message includes identification information of a third storage device on which the matched data is stored. In this case, the user equipment receives the identification information, sent by the first base station, of the third storage device on which the matched data is stored. The user equipment acquires the matched data from the third storage device according to the identification information of the third storage device.

This embodiment of the present invention provides a data transmission method. A user equipment sends a request message to a first base station; so that the first base station retrieves, after receiving the request message sent by the user equipment, in stored data on the first base station according to identification information, in the request message, of requested data; and if matched data is stored on the first base station, the first base station directly sends the matched data to the user equipment. In this way, data is stored on a base station side, and therefore, when different user equipments served by a base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience.

An embodiment of the present invention provides a data transmission method, and the method includes the following steps.

301. A UE sends a Radio Resource Control (RRC) link establishment request message to a first base station, so that the first base station establishes an RRC link with the UE.

The first base station receives the RRC link establishment request message sent by the UE.

When accessing the first base station for the first time, the UE needs to send the RRC link establishment request message to the first base station, so as to establish the RRC link between the UE and the first base station, so that the UE sends data to the first base station over the RRC link.

302. The first base station establishes the RRC link with the UE according to the RRC link establishment request message.

After receiving the RRC link establishment request message, the first base station establishes the RRC link according to the RRC link establishment request message. A process in which the first base station establishes the RRC link between the first base station and the UE is the same as that in a method in the prior art, and details are not described herein again.

303. The UE sends, to a Mobility Management Entity (MME), a Packet Data Network (PDN) link establishment request message carrying PDN address information, so that the MME establishes a bearer link between the UE and a Packet Data Network Gateway (PDN GW) according to the PDN address information carried in the PDN link establishment request message. The MME receives the PDN link establishment request message carrying the PDN address information.

304. The MME establishes a bearer link between the UE and the PDN GW according to the PDN address information carried in the PDN link establishment request message.

A method used by the MME to establish the bearer link between the UE and the PDN GW according to the PDN address information after receiving the PDN link establishment request message is the same as a method in the prior art, and details are not described herein again.

305. A first device sends a request message to the first base station, and the first base station receives the request message sent by the first device.

If the first device is a UE, for details about a process in which the UE sends a request message to the first base station, reference may be made to step 201, and details are not described herein again. If the first device is a second base station, for details about a process in which the second base station sends a request message to the first base station, reference may be made to step 3081c, and details are not described herein again. For details about a process in which the first base station receives the request message sent by the first device, reference may be made to step 101, and details are not described herein again.

306. The first base station retrieves in stored data according to identification information of requested data.

This step is the same as step 102, and details are not described herein again.

Figure 3:
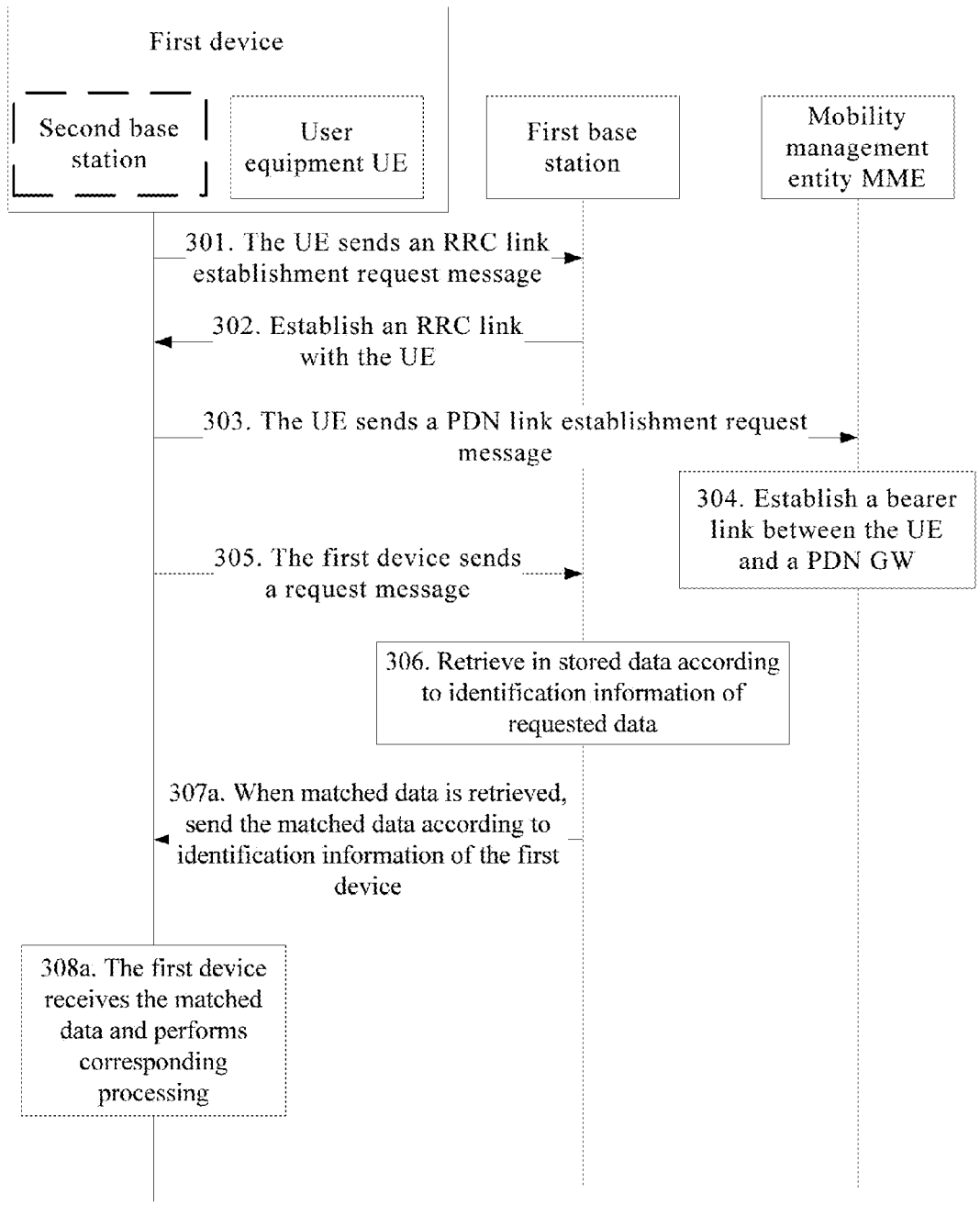
FIG. 3 is a schematic diagram of another data transmission method according to an embodiment of the present invention.
Figure 4:
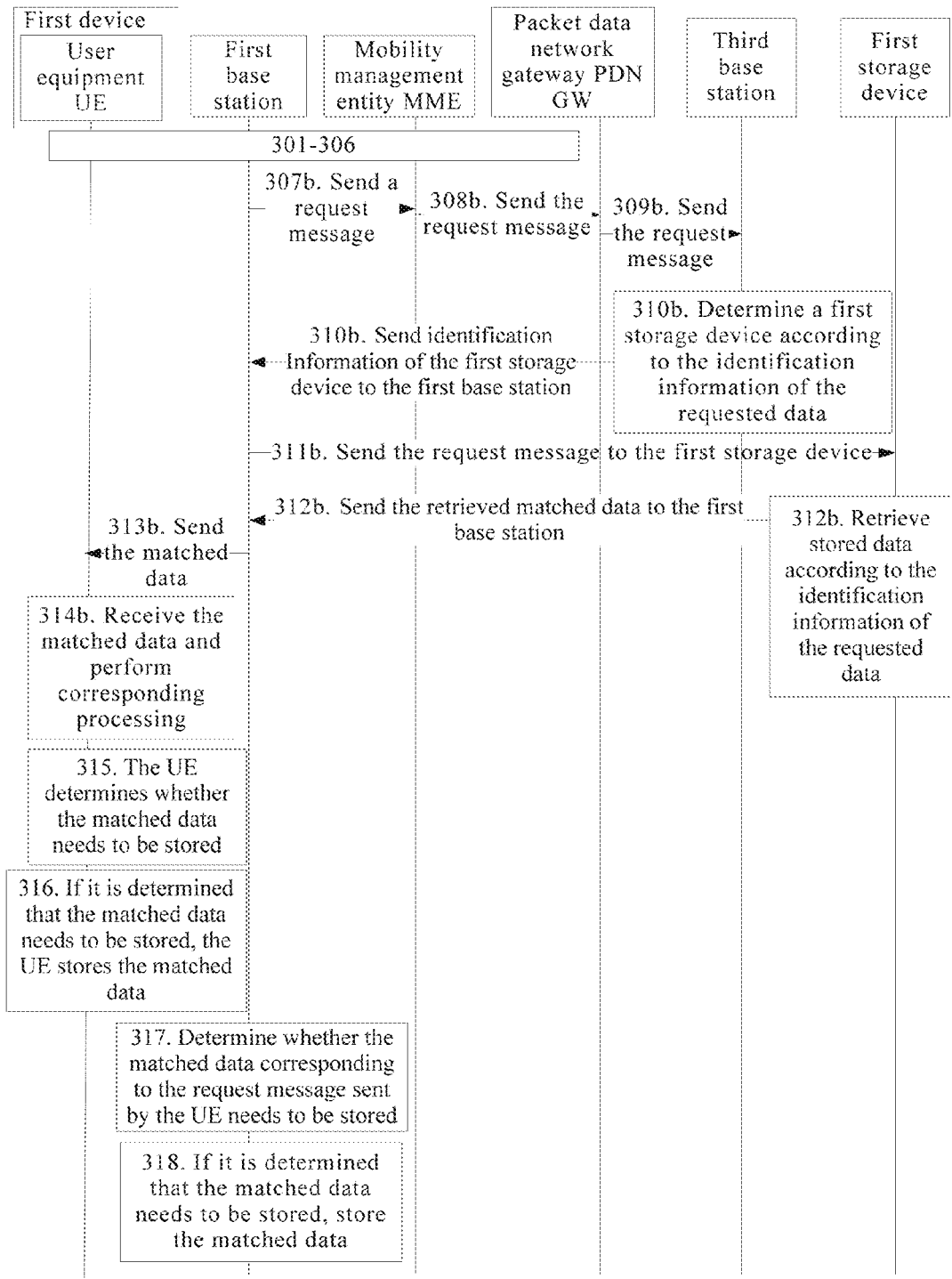
FIG. 4 is a schematic diagram of another data transmission method according to an embodiment of the present invention.
Figure 5:
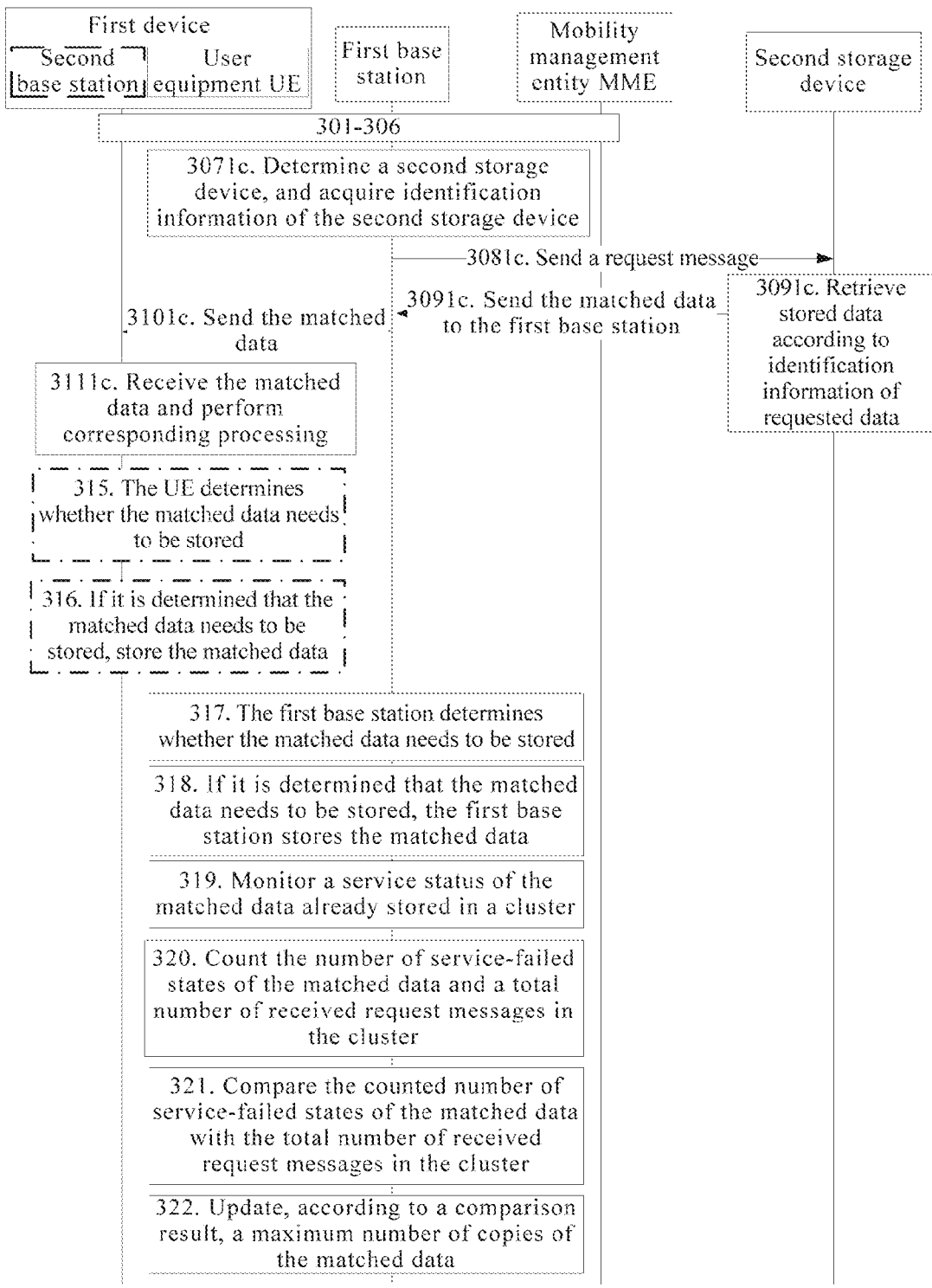
FIG. 5 is a schematic diagram of another data transmission method according to an embodiment of the present invention.
Figure 6:
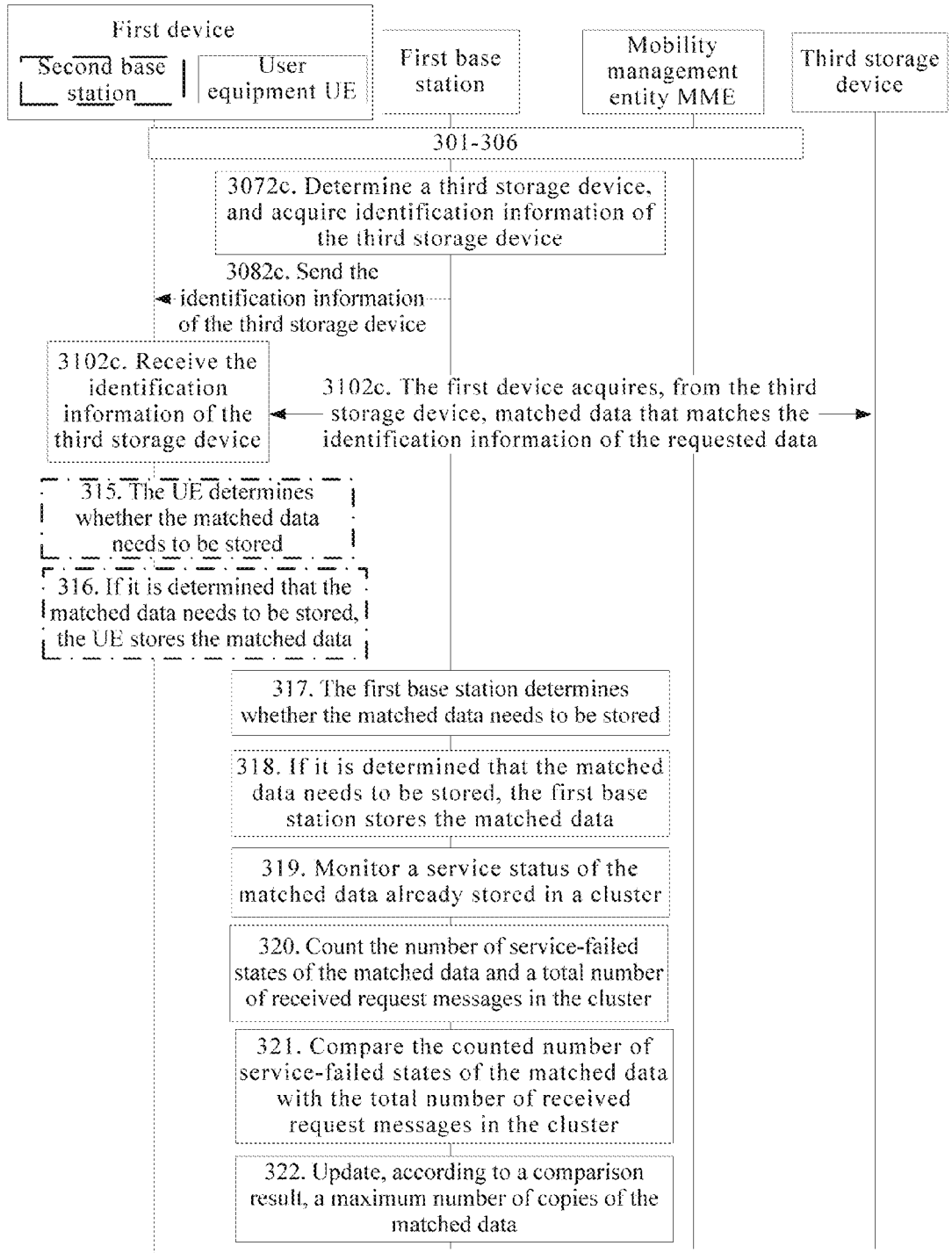
FIG. 6 is a schematic diagram of another data transmission method according to an embodiment of the present invention.

It should be noted that a subsequent step to be performed varies according to a retrieval and detection result of the first base station. If the first base station retrieves in the stored data according to the identification information of the requested data, and if data that matches the identification information of the requested data is retrieved, that is, matched data is retrieved, steps 307a to 308a are performed, as shown in FIG. 3. If no data that matches the identification information of the requested data is retrieved, that is, no matched data is retrieved, the first base station needs to acquire information related to the matched data. When the first base station is not a cluster head, steps 307b to 314b and steps 315 to 318 are performed, as shown in FIG. 4. In this case, the first device is a UE. When the first base station is a cluster head, the first base station may learn about a storage device on which the matched data is stored. In this case, the first base station may acquire the matched data by itself, and sends the matched data to the first device; or may send, to the first device, identification information of the storage device on which the matched data is stored, and the first device acquires the matched data according to the identification information of the storage device. If the first base station acquires the matched data and sends the matched data to the first device, steps 3071c to 3111c and steps 315 to 322 are performed, as shown in FIG. 5. If the first base station sends the identification information of the storage device to the first device, steps 3072c to 3092c and steps 315 to 322 are performed, as shown in FIG. 6.

It should be noted that the cluster head is a base station that is in a cluster and manages other devices. A cluster in which the first base station is located may include the first base station, another neighboring base station, and a UE served by the another neighboring base station. In this case, the cluster head may be the first base station or the another neighboring base station. The cluster in which the first base station is located may also include the first base station and a UE. In this case, the first base station is the cluster head.

307a. When matched data is retrieved by the first base station, send the matched data to the first device according to the identification information of the first device.

This step is the same as step 103, and details are not described herein again.

307b. When no matched data is retrieved by the first base station and the first base station is not a cluster head, send the request message to the PDN GW through an MME, so that the PDN GW sends the request message to a third base station used as a cluster head, and the third base station determines, according to the identification information of the requested data, a first storage device on which the matched data is stored, and sends identification information of the first storage device to the first base station.

When no matched data is retrieved by the first base station, it indicates that data that the first device needs to acquire is not stored on the first base station. In this case, when the first base station is not a cluster head, the first base station needs to send, to the MME, the received request message sent by the first device. The MME receives the request message.

3071c. When no matched data is retrieved by the first base station and the first base station is a cluster head, the first base station determines, according to the identification information of the requested data, a second storage device on which the matched data is stored, and acquires identification information of the second storage device.

When no matched data is retrieved by the first base station, it indicates that data that the first device needs to acquire is not stored on the first base station. In this case, because the first base station is a cluster head, the first base station may search, according to the identification information of the requested data, stored identification information of data stored on each device in the storing cluster, and find the second storage device on which the identification information of the stored data matches the identification information of the requested data, and further acquire the identification information of the second storage device.

It should be noted that, when the first base station is a cluster head, the first base station may receive a request message sent by another base stations in the cluster. In this case, the first device may be a second base station. In this case, the first base station may search, according to identification information that is of requested data and in the request message, the stored identification information of the data stored on each device in the storing cluster; and find a storage device on which the identification information of the stored data matches the identification information, in the request message, of the requested data, and acquire identification information of the storage device.

3072c. When no matched data is retrieved by the first base station and the first base station is a cluster head, the first base station determines, according to the identification information of the requested data, a third storage device on which the matched data that matches the identification information of the requested data is stored, and acquires identification information of the third storage device.

Reference may be made to step 3071c, and details are not described herein again.

308a. The first device receives the matched data and performs corresponding processing.

If the first device is a UE, the UE performs the corresponding processing on the matched data after receiving the matched data. If the first device is a second base station, the second base station sends, after receiving the matched data, the matched data to a UE that is served by the second base station and requests the matched data; and determines whether the matched data needs to be stored; if the matched data needs to be stored, the second base station stores the matched data. For details about the determining whether the matched data needs to be stored, reference may be made to steps 319 to 322, and details are not described herein again.

308b. The MME sends the received request message to the PDN GW, and the PDN GW receives the request message.

After receiving the request message, the MME determines, according to identification information of the UE carried in the request message, a PDN GW corresponding to the UE that sends the request message, and sends the request message to the PDN GW.

3081c. The first base station sends the request message to the second storage device according to the identification information of the second storage device, so that the second storage device acquires the matched data according to the identification information of the requested data and sends the matched data to the first base station.

After acquiring the identification information of the second storage device, the first base station sends the request message to the second storage device according to the identification information of the second storage device.

Optionally, the second storage device is a neighboring base station of the first base station.

3082c. The first base station sends the identification information of the third storage device to the first device, so that the first device acquires the matched data from the third storage device according to the identification information of the third storage device.

Figure 7:
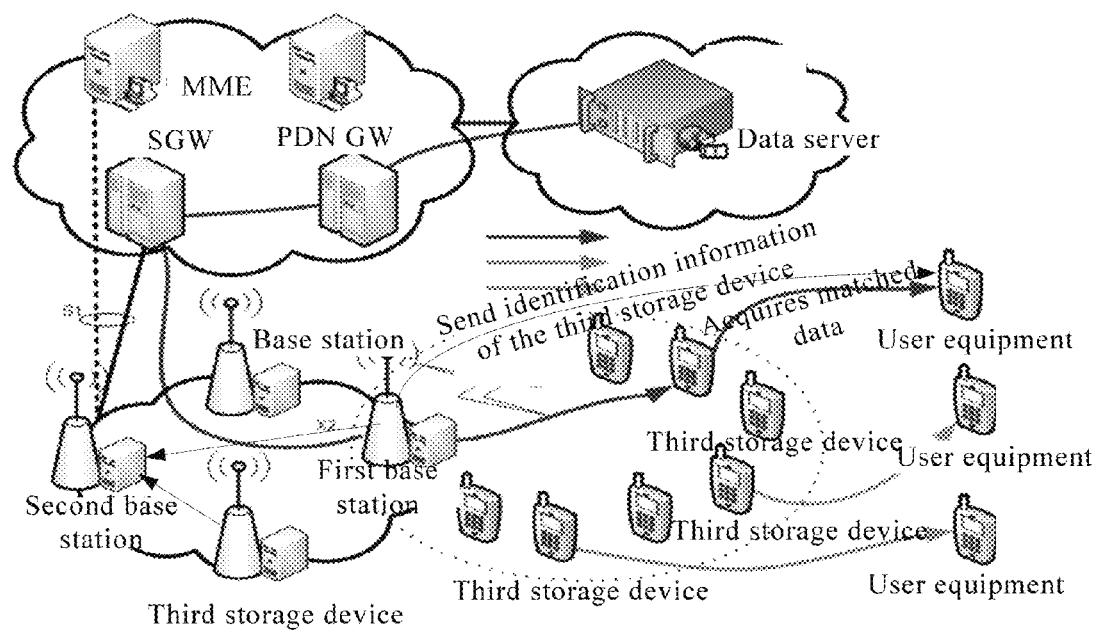
FIG. 7 is a schematic structural diagram of a network structure of data transmission according to an embodiment of the present invention.

After acquiring the identification information of the third storage device, the first base station sends the identification information of the third storage device to the first device, so that the first device communicates with the third storage device to acquire the matched data by itself, as shown in FIG. 7.

309b. The PDN GW sends the request message to the third base station used as a cluster head. The third base station receives the request message.

After the PDN GW receives the request message, the PDN GW sends the request message to a cluster head of the cluster in which the first base station is located.

It should be noted that the cluster head of the cluster in which the first base station is located is configured in advance. After the cluster head of the cluster in which the first base station is located is configured, the PDN GW records member information of each cluster.

3091c. The second storage device retrieves in stored data according to the identification information, carried in the request message, of the requested data, and sends the retrieved matched data to the first base station.

The second storage device retrieves in the stored data according to the identification information, carried in the request message, of the requested data, where the retrieval is the same as a process in which the first base station retrieves in the stored data according to the identification information of the requested data. Reference may be made to step 102, and details are not described herein again.

3092c. The first device receives a response message sent by the first base station in response to the request message, and performs corresponding processing according to the response message in response to the request message.

When the first device is a UE, the UE receives the response message sent by the first base station in response to the request message, and performs the corresponding processing according to the response message in response to the request message.

The UE receives the identification information, sent by the first base station, of the third storage device on which matched data is stored. The UE acquires the matched data from the third storage device according to the identification information of the third storage device. In addition, the UE continues to perform steps 315 to 316.

Further, the UE receives the identification information that is sent by the first base station and of the third storage device on which the matched data is stored, and the UE establishes a Device-to-Device (D2 D) link with the third storage device according to the identification information of the third storage device. In addition, the UE acquires the matched data through the D2 D link.

Optionally, the identification information of the third storage device is identification information of a UE on which the matched data is stored.

It should be noted that, the first device may establish, according to the identification information of the third storage device, a D2 D link with the third storage device by using the first base station; or the first device may directly establish, according to the identification information of the third storage device, a D2 D link with the third storage device without using the first base station, and the present invention does not set a limitation thereto.

When the first device is a second base station, the second base station receives the response message sent by the first base station in response to the request message, and performs corresponding processing according to the response message in response to the request message.

The second base station receives the identification information, sent by the first base station, of the third storage device on which the matched data is stored. The second base station acquires the matched data from the third storage device according to the identification information of the third storage device, and sends the acquired matched data to a UE that is served by the second base station and requests the matched data; and determines whether the matched data needs to be stored; if the matched data needs to be stored, the second base station stores the matched data. For details about the determining whether the matched data needs to be stored, reference may be made to steps 319 to 322, and details are not described herein again.

310b. The third base station determines, according to the identification information of the requested data, the first storage device on which the matched data is stored, and sends the identification information of the first storage device to the first base station. The first base station receives the identification information of the first storage device.

After receiving the request message, the third base station used as a cluster head searches, according to the identification information that is of the requested data and in the request message, stored identification information of data stored on each device in the storing cluster; finds the first storage device on which the identification information of the stored data matches the identification information, in the request message, of the requested data; and sends the identification information of the first storage device to the first base station.

After receiving the request message, the third base station used as a cluster head may first search, according to the identification information that is of the requested data and in the request message, data stored by the third base station; and if the matched data is found, the matched data is directly sent to the first base station. If no matched data is found, it indicates that the data required by the first base station is not stored on the third base station; therefore, the third base station continues to search the stored identification information of the data stored on each device in the storing cluster; determines, according to the identification information that is of the requested data and in the request message, the first storage device on which the matched data is stored; and sends the identification information of the first storage device to the first base station. In this case, the first storage device does not include the third base station.

Certainly, after receiving the request message, the third base station may directly search, according to the identification information that is of the requested data and in the request message, the stored identification information of the data stored on each device in the storing cluster; determine, according to the identification information that is of the requested data and in the request message, the first storage device on which the matched data is stored; and send the identification information of the first storage device to the first base station. In this case, the first storage device may be the third base station.

Further, the third base station may store, in a list form, the identification information of the data stored on each device in the cluster.

It should be noted that the third base station may store, in another form, the identification information of the data stored on each device in the cluster, for example, in a form of a mapping table; and the present invention sets no limitation thereto.

Still further, if it is determined that only one first storage device on which the matched data is stored exists in the cluster, the third base station used as a cluster head sends the identification information of the first storage device to the first base station. If the third base station used as a cluster head determines that at least two first storage devices on which the matched data is stored exist in the cluster, the third base station may select any one of the at least two first storage devices on which the matched data is stored, and send identification information of a selected first storage device to the first base station. The third base station may select, according to a preset algorithm, an optimal first storage device on which the matched data is stored, and send identification information of this first storage device to the first base station.

It should be noted that if the first base station is not a cluster head, the cluster in which the first base station is located includes the first base station, another neighboring base station, and UEs served by the another neighboring base station. In this case, the first storage device may be the another neighboring base station.

3101c. The first base station receives the matched data sent by the second storage device, and sends the matched data to the first device.

Figure 8:
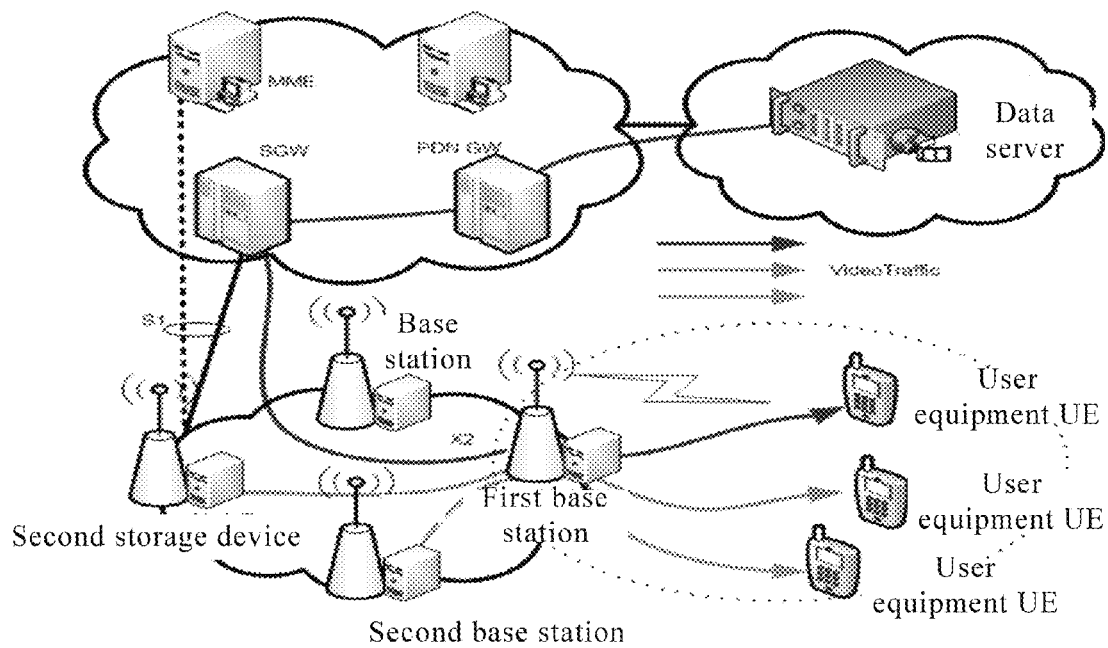
FIG. 8 is a schematic structural diagram of another network structure of data transmission according to an embodiment of the present invention.

If the request message received by the first base station is sent by the UE, the matched data acquired by the first base station is sent to the UE; and if the request message received by the first base station is sent by the second base station, the matched data acquired by the first base station is sent to the second base station, as shown in FIG. 8.

311b. The first base station sends the request message to the first storage device according to the identification information of the first storage device, so that the first storage device sends, after receiving the request message, the stored matched data that matches the identification information, in the request message, of the requested data to the first base station. The first storage device receives the request message.

After receiving the identification information of the first storage device, the first base station sends the request message to the first storage device according to the identification information of the first storage device. Reference may be made to step 3081c, and details are not described herein again.

3111c. The first device receives the matched data sent by the first base station and performs corresponding processing.

If the first device is the second base station, the second base station may send the received matched data to the UE that is served by the second base station and requests the matched data, and determine whether the matched data needs to be stored; if the matched data needs to be stored, the second base station stores the matched data. For details about the determining whether the matched data needs to be stored, reference may be made to steps 319 to 322, and details are not described herein again.

If the first device is the UE, the UE may perform the corresponding processing according to the received matched data, and the UE continues to perform steps 315 to 316.

312b. The first storage device retrieves in the stored data according to the identification information, carried in the request message, of the requested data, and sends the first base station the retrieved stored matched data that matches the identification information, in the request message, of the requested data.

The first storage device retrieves in the stored data according to the identification information, carried in the request message, of the requested data, where the retrieval is the same as the process in which the first base station retrieves in the stored data according to the identification information, carried in the request message, of the requested data. Reference may be made to step 102, and details are not described herein again.

313b. The first base station receives the matched data sent by the first storage device, and sends the matched data to the first device.

If the request message received by the first base station is sent by the first device, the first base station sends the acquired matched data to the first device. Reference may be made to step 3101c. When the first device is a UE, reference may be made to FIG. 8.

314b. The first device receives the matched data and performs corresponding processing.

The first device is the UE, and the UE receives the matched data sent by the first base station, and performs the corresponding processing according to the matched data.

315. The UE determines whether the received matched data corresponding to the request message needs to be stored.

The UE determines the number of times the request message is sent to the first base station; and detects whether the number of times the request message is sent to the first base station is greater than a first threshold. When it is determined that the number of times the request message is sent to the first base station is greater than the first threshold, the UE acquires, from a cluster head, a maximum number of copies allowed in copying the matched data in the cluster and the number of times the matched data is already stored in the cluster. If the number of times the matched data is already stored in the cluster is less than the maximum number of copies allowed in copying the matched data in the cluster, the UE determines that the matched data needs to be stored.

Further, because the cluster head is the first base station, when it is determined that the number of times the request message is sent to the first base station is greater than the first threshold, that the UE acquires, from a cluster head, a maximum number of copies allowed in copying the matched data in a cluster and the number of times the matched data is already stored in the cluster includes, when the number of times the request message is sent to the first base station is greater than the first threshold, acquiring, by the UE from the first base station, the maximum number of copies allowed in copying the matched data in the cluster and the number of times the matched data is already stored in the cluster.

Figure 9:
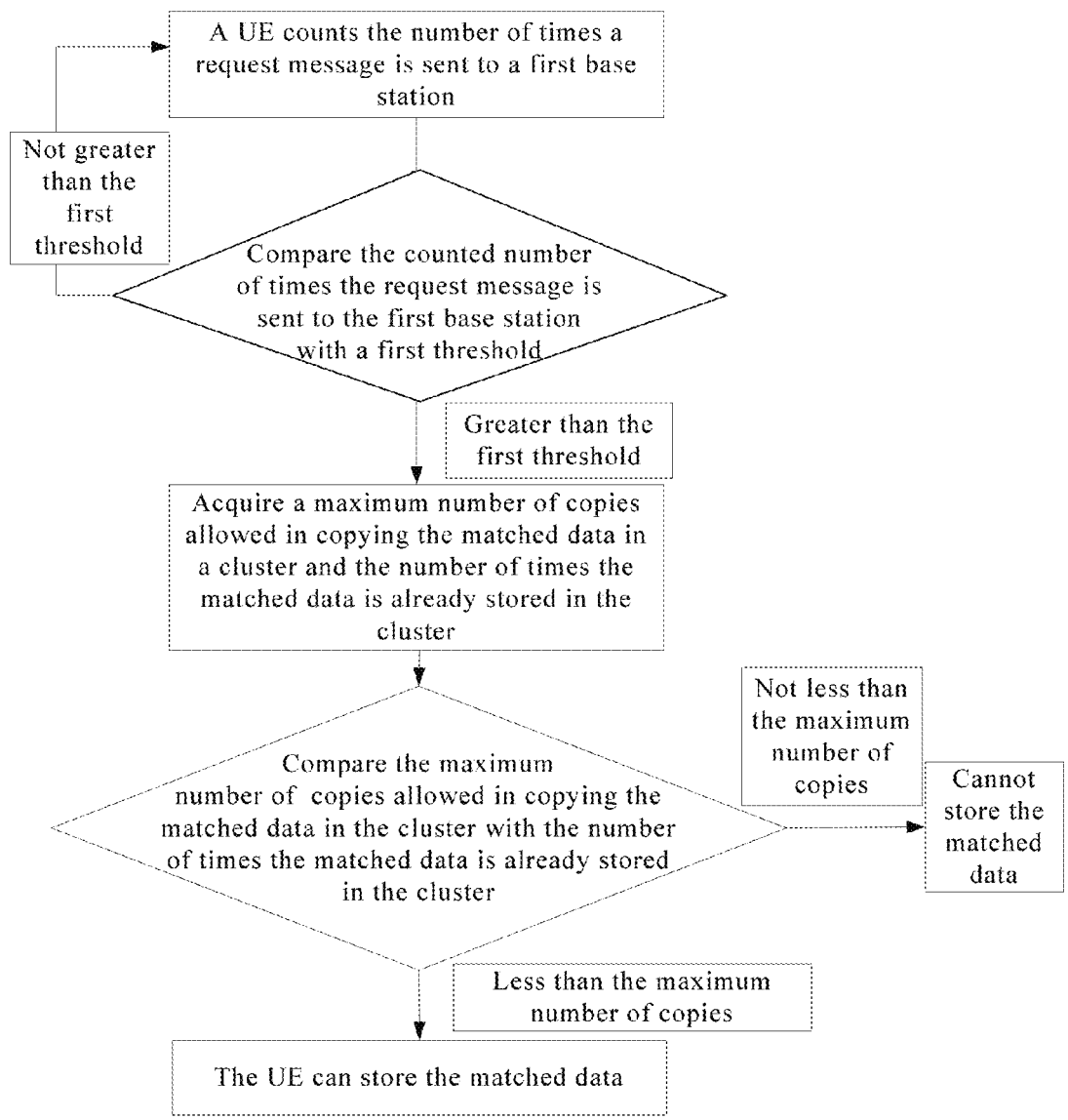
FIG. 9 is a schematic diagram of a data storage method according to an embodiment of the present invention.

After the UE receives the matched data corresponding to the request message, the UE counts the number of times the request message is sent to the first base station, and compares the counted number of times the request message is sent to the first base station with the first threshold. If the counted number of times the request message is sent to the first base station is greater than the first threshold, it indicates that the UE needs to frequently acquire the matched data, and therefore, the UE needs to store the matched data corresponding to the received request message. In this case, the UE acquires, from the first base station, the maximum number of copies allowed in copying the matched data in the cluster and the number of times the matched data is already stored in the cluster. The UE compares the maximum number of copies allowed in copying the matched data in the cluster with the number of times the matched data is already stored in the cluster. If it is found through comparison that the maximum number of copies allowed in copying the matched data in the cluster is greater than the number of times the matched data is already stored in the cluster, the UE determines that the matched data corresponding to the request message can be stored. If it is found through comparison that the maximum number of copies allowed in copying the matched data in the cluster is not greater than the number of times the matched data is already stored in the cluster, it indicates that matched data, stored in the cluster, corresponding to the request message already reaches a maximum value. In this case, the UE cannot store the matched data corresponding to the request message, as shown in FIG. 9.

316. When it is determined that the matched data corresponding to the received request message needs to be stored, the UE stores the matched data corresponding to the received request message.

When the UE determines that the matched data corresponding to the request message needs to be stored, the UE stores the matched data corresponding to the request message in free storage space of the UE. The UE stores the matched data, and updates the number of times the matched data is already stored in the cluster.

Further, the UE sends, to the cluster head, the updated number of times the matched data is already stored in the cluster, so that the cluster head updates the number of times the matched data is already stored in the cluster.

Because the first base station is the cluster head, the UE may send, to the first base station, the updated number of times the matched data is already stored in the cluster, so that the first base station updates the number of times the matched data is already stored in the cluster.

317. The first base station determines whether the matched data corresponding to the request message sent by the UE needs to be stored.

The first base station determines the number of times the request message is received; and when it is determined that the number of times the request message is received is greater than the first threshold, acquires the maximum number of copies allowed in copying the matched data in the cluster and the number of times the matched data is already stored in the cluster. When the number of times the matched data is already stored in the cluster is less than the maximum number of copies allowed in copying the matched data in the cluster, the first base station stores the matched data. That is, when the number of times the matched data is already stored in the cluster is less than the maximum number of copies allowed in copying the matched data in the cluster, the first base station determines that the matched data needs to be stored.

Figure 10:
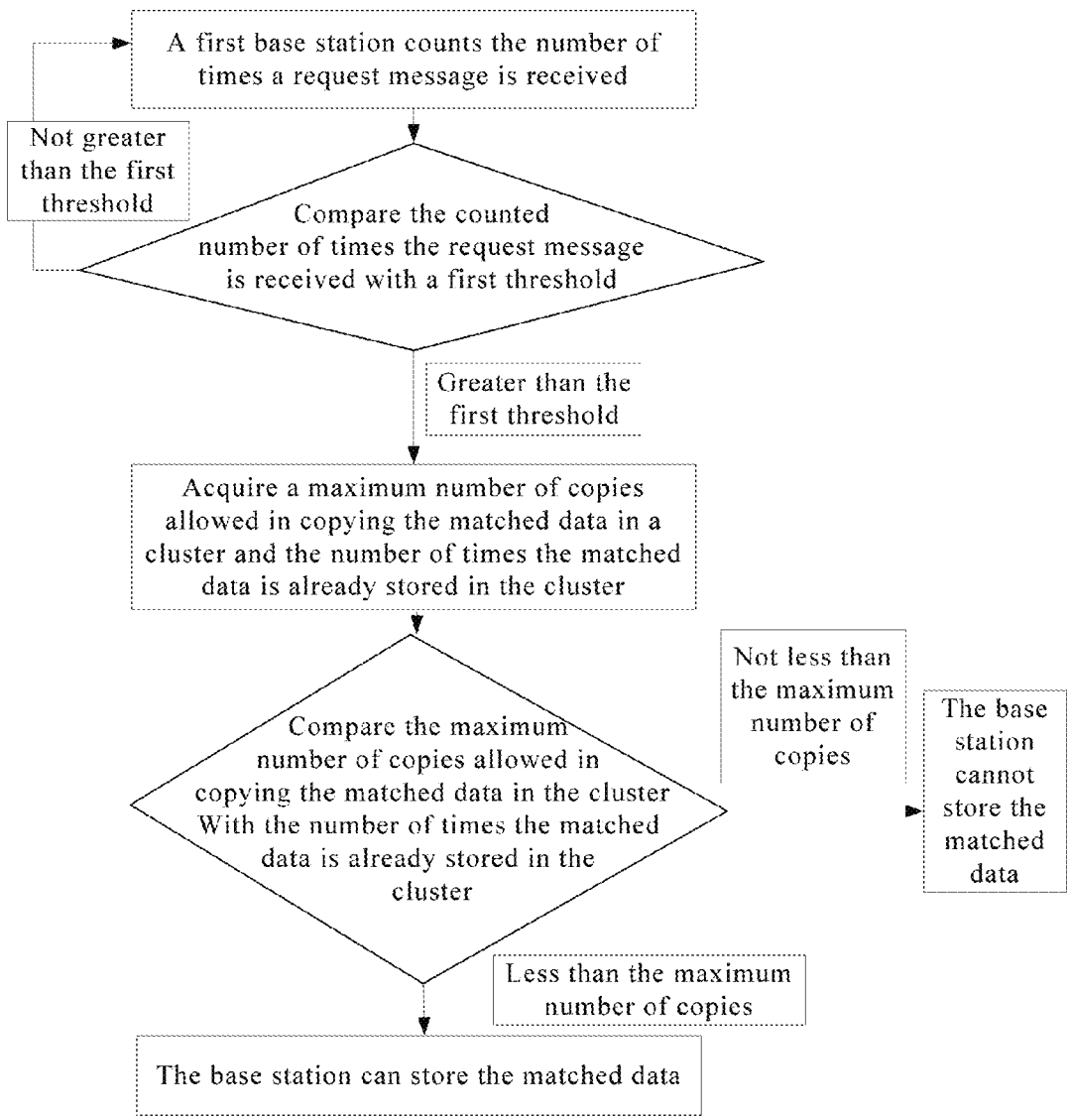
FIG. 10 is a schematic diagram of another data storage method according to an embodiment of the present invention.

The first base station needs to count the number of times the request message is received, and compares the counted number of times the request message is received with the first threshold. If the counted number of times the request message is received is greater than the first threshold, it indicates that the UE served by the first base station needs to frequently acquire the matched data, and therefore, the first base station needs to store the matched data corresponding to the request message. In this case, the first base station acquires the maximum number of copies allowed in copying the matched data in the cluster and the number of times the matched data is already stored in the cluster. The first base station compares the maximum number of copies allowed in copying the matched data in the cluster with the number of times the matched data is already stored in the cluster. If it is found through comparison that the maximum number of copies allowed in copying the matched data in the cluster is greater than the number of times the matched data is already stored in the cluster, the first base station determines that the matched data corresponding to the request message can be stored. If it is found through comparison that the maximum number of copies allowed in copying the matched data in the cluster is not greater than the number of times the matched data is already stored in the cluster, it indicates that matched data, stored in the cluster, corresponding to the request message already reaches a maximum value. In this case, the first base station cannot store the matched data corresponding to the request message, as shown in FIG. 10.

Optionally, if the first base station is not the cluster head of the cluster in which the first base station is located, the first base station may acquire, by using a cluster head, the maximum number of copies allowed in copying the matched data in the cluster and the number of times the matched data is already stored in the cluster. If the first base station is the cluster head of the cluster in which the first base station is located, the first base station directly acquires a maximum number of copies allowed in copying the matched data in the cluster and the number of times the matched data is already stored in the cluster, where the maximum number of copies and the number of times the matched data is already stored in the cluster are stored in the first base station.

Further, when the first base station determines that the number of times the request message is received is not greater than the first threshold, it indicates that the UE served by the first base station does not need to frequently acquire the matched data, and the first base station does not need to store the matched data corresponding to the request message.

Exemplarily, it is assumed that the request message sent by the UE to the first base station is a video request message. In this case, the first base station needs to count the number of times the video request message is received, which is 7; and the first threshold is 5. Therefore, the first base station compares the counted number of times the video request message is received, which is 7, with the first threshold 5. It is found that the counted number of times the video request message is received is greater than the first threshold 5, which indicates that the UE served by the first base station frequently requests this video information. Therefore, in this case, if the first base station is a cluster head, the first base station directly acquires a maximum number of copies allowed in copying the matched data in a cluster, which is 8, and the number of times the matched data is stored in the cluster, which is 4, where the maximum number of copies and the number of times the matched data is already stored in the cluster are stored in the first base station. If the first base station is not a cluster head, the first base station acquires, by using a cluster head, a maximum number of copies allowed in copying the matched data in the cluster, which is 8, and the number of times the matched data is stored in the cluster, which is 4; and detects that the number of times the matched data is stored in the cluster, which is 4, is less than the maximum number of copies allowed in copying the matched data in the cluster, which is 4. Therefore, the first base station determines that matched video information corresponding to the video request message can be stored.

It should be noted that the first threshold is preset.

318. If it is determined that the matched data corresponding to the request message needs to be stored, the first base station stores the matched data corresponding to the request message.

When it is determined that the matched data corresponding to the request message needs to be stored, the first base station stores the acquired matched data corresponding to the request message in free storage space of the first base station. In addition, the first base station updates the number of times the matched data is already stored in the cluster.

If the first base station is the cluster head of the cluster in which the first base station is located, the first base station directly updates the number of times the matched data is already stored in the cluster, where the number of times is stored in the first base station.

If the first base station is not the cluster head of the cluster in which the first base station is located, the first base station may send, to the cluster head, the updated number of times the matched data is already stored in the cluster, so that the cluster head updates the number of times the matched data is already stored in the cluster.

As mentioned in the foregoing example, if the first base station is the cluster head of the cluster in which the first base station is located, the first base station directly updates the number of times the matched data is already stored in the cluster from 4 to 5, where the number of times is stored in the first base station.

If the first base station is not the cluster head of the cluster in which the first base station is located, when storing the matched video information in free storage space, the first base station may update the number of times the matched data is already stored in the cluster to 5, and send, to the cluster head, the number of times the matched data is stored in the cluster, which is 5, so that the cluster head updates the number of times the matched data is already stored in the cluster from 4 to 5.

Further, that the first base station stores the matched data includes determining, by the first base station, whether a size of the free storage space is greater than a size of the matched data; if the size of the free storage space is greater than the size of the matched data, the first base station directly stores the matched data; and if the size of the free storage space is not greater than the size of the matched data, the first base station updates the free storage space according to a Least Recently Used (LRU) algorithm so that the size of the free storage space is greater than the size of the matched data, and stores the matched data in the updated free storage space.

It should be noted that in this embodiment of the present invention, another algorithm such as a first in first out algorithm may also be used to update the free storage space, and the present invention sets no limitation thereto.

It should be noted that, when the first base station is not the cluster head, the first base station may also directly send the request message to the cluster head of the cluster in which the first base station is located, so as to acquire the matched data corresponding to the request message. Reference may be made to a process in which the second base station sends a request message to the first base station, and details are not described herein again.

319. When the first base station is the cluster head, the first base station monitors a service status of the matched data already stored in the cluster.

The service status includes a service-succeeded state and a service-failed state, where the service-succeeded state refers to that the matched data is sent to the first device, and the service-failed state refers to that the matched data is not sent to the first device.

In order to achieve that, when an amount of requested data in a cluster becomes very large, the maximum number, which is set in the cluster, of copies allowed in copying the matched data in the cluster is also adjusted accordingly, the first base station needs to monitor the service status of the matched data already stored in the cluster, where the first station is used as the cluster head of the cluster in which the first base station is located.

Exemplarily, if data information is video information, when access traffic to the video information in the cluster becomes very large, for example, the video is accessed for 1 million times, the maximum number, which is set in the cluster, of copies allowed in copying the video information in the cluster also needs to be adjusted accordingly. In order to achieve that purpose, the first base station needs to monitor the service status of the video information.

320. The first base station counts the number of service-failed states of the matched data and a total number of received request messages in the cluster according to the service status of the matched data.

It should be noted that the service-failed state of the matched data may be caused by reasons such as a too long network delay or congestion in a transmission process. When a piece of data information is acquired by plenty of UEs, the matched data may be put into a service-failed state. Therefore, in order to achieve that, when the requested amount of data information in a cluster is very large, the maximum number, which is set in the cluster, of copies allowed in copying the matched data in the cluster is also adjusted accordingly, the first base station needs to count the number of service-failed states of the matched data.

It should be noted that, the counting a total number of received request messages in a cluster refers to counting all received request messages in the cluster, including the request message sent by the first device and also including a request message sent by another device and received by the first base station.

321. The first base station compares the counted number of service-failed states of the matched data with the total number of received request messages in the cluster.

The first base station counts the number of service-failed states of the matched data and the total number of received request messages in the cluster, and compares the counted number of service-failed states of the matched data with the total number of received request messages in the cluster; and may acquire a percentage of the counted number of service-failed states of the matched data to the counted total number of received request messages in the cluster.

It should be noted that a difference between the counted number of service-failed states of the matched data and the counted total number of received request messages in the cluster may also be acquired, or another comparing method may be used, and the present invention sets no limitation thereto.

322. The first base station updates, according to a comparison result, the maximum number of copies allowed in copying the matched data.

If the comparison result is greater than a second threshold, the first base station increases the maximum number of copies allowed in copying the matched data; or if the comparison result is less than a third threshold, the first base station decreases the maximum number of copies allowed in copying the matched data.

It should be noted that the second threshold and the third threshold are preset.

Exemplarily, it is assumed that, in step 321, the first base station obtains, through calculation, the percentage of the counted number of service-failed states of the matched data to the counted total number of received request messages in the cluster. If the second threshold is 10% and the third threshold is 5%, and if it is calculated that the percentage of the counted number of service-failed states of the matched data to the counted total number of received request messages in the cluster is 15%, which is greater than the second threshold, the first base station needs to increase the maximum number of copies allowed in copying the matched data.

This embodiment of the present invention provides a data transmission method. After receiving a request message sent by a first device, a first base station retrieves in stored data according to identification information, in the request message, of requested data; and if matched data exists on the first base station, the base station directly sends the matched data to the first device. In this way, data is stored on a base station side, and therefore, when different user equipments served by a base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the UE, which reduces waiting time of the user equipment and improves user experience. A storage condition of the data information on the base station side is dynamically changed according to a data information requirement of the user equipment, which further improves availability of system storage space.

Figure 11:
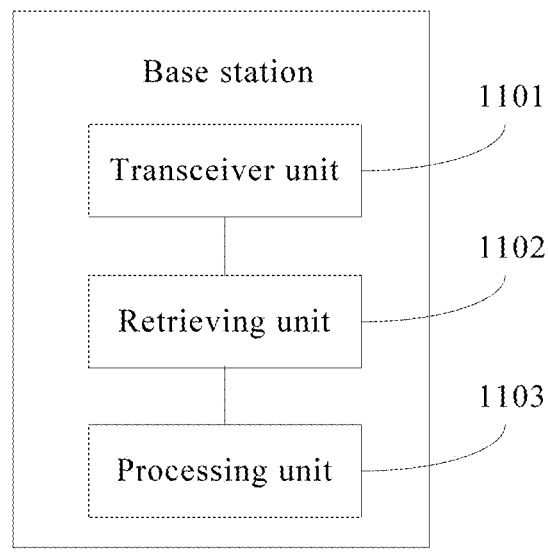
FIG. 11 is a schematic structural diagram of a base station according to an embodiment of the present invention.

An embodiment of the present invention provides a base station. As shown in FIG. 11, the base station includes a transceiver unit 1101, a retrieving unit 1102, and a processing unit 1103.

The transceiver unit 1101 is configured to receive a request message sent by a first device.

The request message carries identification information of requested data and identification information of the first device, and the first device includes a user equipment or a second base station.

The retrieving unit 1102 is configured to retrieves in stored data according to the identification information, received by the transceiver unit 1101, of the requested data.

The processing unit 1103 is configured to, when matched data is retrieved by the retrieving unit 1102, trigger the transceiver unit 1101 to send, according to the identification information of the first device, the matched data to the first device.

The matched data refers to data that matches the identification information of the requested data.

The processing unit 1103 is configured to, when the transceiver unit 1101 receives the request message sent by the user equipment, when the matched data is retrieved by the retrieving unit 1102, trigger the transceiver unit 1101 to send the matched data to the user equipment; and when the transceiver unit 1101 receives a request message sent by a second base station, when the matched data is retrieved by the retrieving unit 1102, send the matched data to the second base station.

Further, the processing unit 1103 is further configured to, when no matched data is retrieved by the retrieving unit 1102 and the base station is not a cluster head, trigger the transceiver unit 1101 to send the request message to a packet data network gateway through a mobility management entity, so that the packet data network gateway sends the request message to a third base station used as a cluster head, and the third base station determines, according to the identification information of the requested data, a first storage device on which the matched data is stored, and sends identification information of the first storage device to the base station.

The transceiver unit 1101 is further configured to receive the identification information of the first storage device.

The transceiver unit 1101 is further configured to send the request message to the first storage device according to the identification information of the first storage device, so that the first storage device sends, after receiving the request message, the stored matched data that matches the identification information, in the request message, of the requested data to the base station.

The transceiver unit 1101 is further configured to receive the matched data sent by the first storage device, and send the matched data to the first device.

Further, the processing unit 1103 is further configured to, when no matched data is retrieved by the retrieving unit 1102 and the base station is a cluster head, determine, according to the identification information of the requested data, a second storage device on which the matched data is stored, and acquire identification information of the second storage device.

The transceiver unit 1101 is further configured to send the request message to the second storage device according to the identification information, acquired by the processing unit 1103, of the second storage device, so that the second storage device acquires the matched data according to the identification information of the requested data and sends the matched data to the base station.

The transceiver unit 1101 is further configured to receive the matched data sent by the second storage device.

The transceiver unit 1101 is further configured to send the matched data to the first device.

Alternatively, the processing unit 1103 is further configured to, when no matched data is retrieved by the retrieving unit 1102 and the base station is a cluster head, determine, according to the identification information of the requested data, a third storage device on which the matched data that matches the identification information of the requested data is stored, and acquire identification information of the third storage device.

The transceiver unit 1101 is further configured to send the identification information, acquired by the processing unit 1103, of the third storage device, to the first device, so that the first device acquires the matched data from the third storage device according to the identification information of the third storage device.

Figure 12:
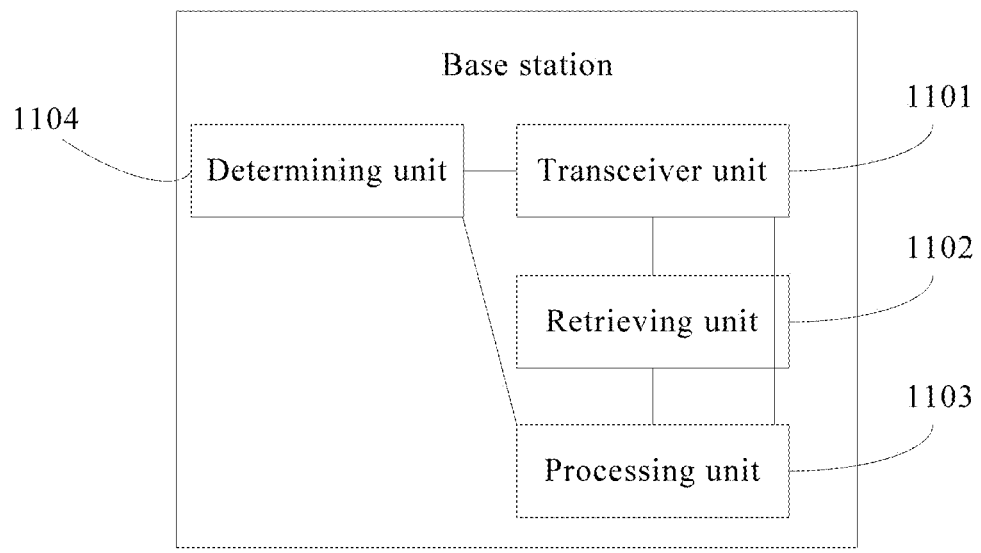
FIG. 12 is a schematic structural diagram of another base station according to an embodiment of the present invention.

As shown in FIG. 12, the base station further includes a determining unit 1104 configured to determine the number of times the request message is received.

The processing unit 1103 is further configured to, when it is determined that the number of times the request message is received is greater than a first threshold, acquire a maximum number of copies allowed in copying the matched data in a cluster and the number of times the matched data is already stored in the cluster.

Further, the processing unit 1103 is further configured to, when the base station is not a cluster head, acquire, by using a cluster head, the maximum number of copies allowed in copying the matched data in the cluster and the number of times the matched data is already stored in the cluster.

The processing unit 1103 is further configured to, when the number of times the matched data is already stored in the cluster is less than the maximum number of copies allowed in copying the matched data in the cluster, store the matched data, and update the number of times the matched data is already stored in the cluster.

Further, the transceiver unit 1101 is further configured to, when the base station is not a cluster head, send, to the cluster head, the number of times the matched data is already stored in the cluster, where the number of times is updated by the processing unit 1103, so that the cluster head updates the number of times the matched data is already stored in the cluster.

Further, the determining unit 1104 is further configured to determine whether a size of free storage space is greater than a size of the matched data.

The processing unit 1103 is further configured to directly store the matched data when the determining unit 1104 determines that the size of the free storage space is greater than the size of the matched data; and when the determining unit 1104 determines that the size of the free storage space is not greater than the size of the matched data, update the free storage space according to an LRU algorithm, and store the matched data in the updated free storage space.

Figure 13:
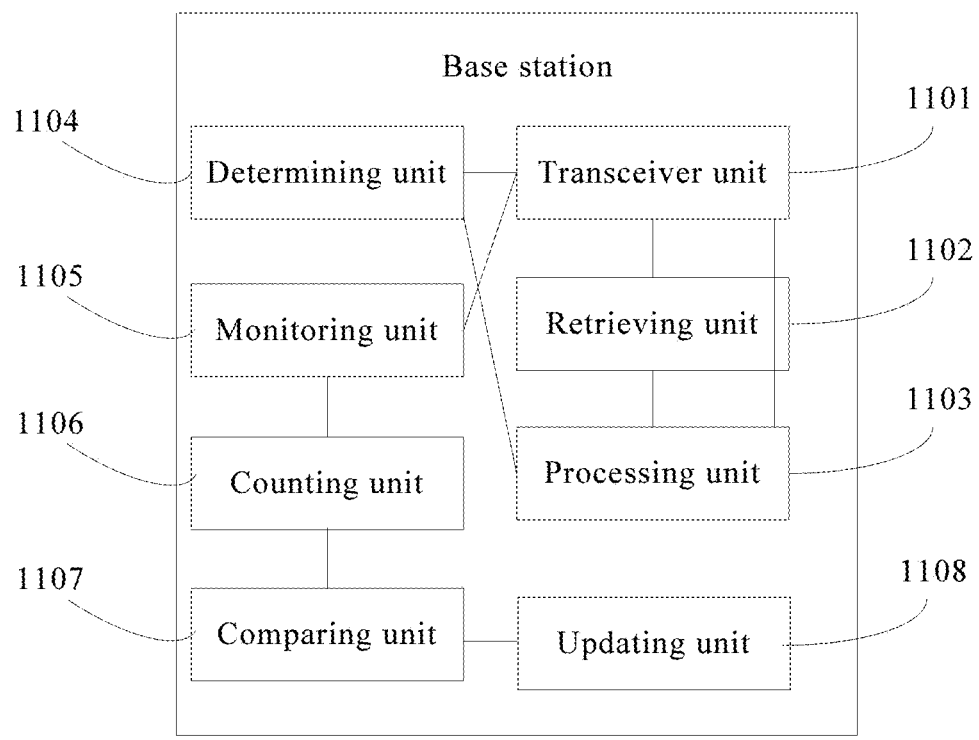
FIG. 13 is a schematic structural diagram of another base station according to an embodiment of the present invention.

As shown in FIG. 13, the foregoing base station further includes a monitoring unit 1105, a counting unit 1106, a comparing unit 1107, and an updating unit 1108.

The monitoring unit 1105 is configured to, when the base station is a cluster head, monitor a service status of the matched data already stored in the cluster.

The service status includes a service-succeeded state and a service-failed state. The service-succeeded state refers to that the matched data is sent to the first device, and the service-failed state refers to that the matched data is not sent to the first device.

The counting unit 1106 is configured to count the number of service-failed states of the matched data and a total number of received request messages in the cluster according to the service status of the matched data.

The comparing unit 1107 is configured to compare the number of service-failed states of the matched data counted by the counting unit 1106 with the total number of received request messages in the cluster counted by the counting unit 1106.

The updating unit 1108 is configured to update, according to a comparison result determined by the comparing unit 1107, the maximum number of copies allowed in copying the matched data.

The updating unit 1108 is configured to, when the comparison result determined by the comparing unit 1107 is greater than a second threshold, increase the maximum number of copies allowed in copying the matched data; or when the comparison result is less than a third threshold, decrease the maximum number of copies allowed in copying the matched data.

Further, the transceiver unit 1101 is further configured to receive a radio resource control link establishment request message sent by the user equipment.

The processing unit 1103 is further configured to establish a radio resource control link with the user equipment according to the radio resource control link establishment request message received by the transceiver unit 1101.

This embodiment of the present invention provides a base station. After a request message sent by a first device is received, stored data is retrieved according to identification information, in the request message, of requested data; and if matched data exists on the base station, the base station directly sends the matched data to the first device. In this way, data is stored on a base station side, and therefore, when different user equipments served by the base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience. A storage condition of the data information on the base station side is dynamically changed according to a data information requirement of the user equipment, which further improves availability of system storage space.

Figure 14:
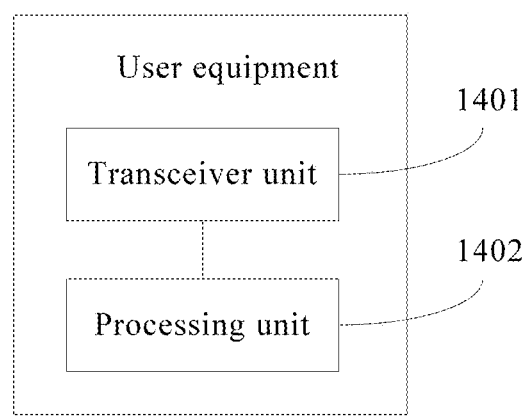
FIG. 14 is a schematic structural diagram of a user equipment according to an embodiment of the present invention.

An embodiment of the present invention provides a user equipment. As shown in FIG. 14, the user equipment includes a transceiver unit 1401 and a processing unit 1402.

The transceiver unit 1401 is configured to send a request message to a first base station.

The request message carries identification information of requested data and identification information of the user equipment, so that the first base station retrieves in stored data on the first base station according to the identification information of the requested data; and if matched data is stored on and retrieved from the first base station, the first base station directly sends the matched data to the user equipment.

The matched data refers to data that matches the identification information of the requested data.

The transceiver unit 1401 is further configured to receive a response message sent by the first base station in response to the request message.

The response message includes the matched data.

The transceiver unit 1401 is configured to receive the matched data sent by the first base station.

Alternatively, the response message includes identification information of a third storage device on which the matched data is stored.

The transceiver unit 1401 is configured to receive the identification information, sent by the first base station, of the third storage device on which the matched data is stored.

The processing unit 1402 is configured to perform corresponding processing according to the response message received by the transceiver unit 1401.

When the transceiver unit 1401 receives the identification information, by the first base station, of the third storage device on which the matched data is stored, the processing unit 1402 is configured to acquire the matched data from the third storage device according to the identification information, received by the transceiver unit 1401, of the third storage device on which the matched data is stored.

The processing unit 1402 is configured to establish a device-to-device link with the third storage device according to the identification information, received by the transceiver unit 1401, of the third storage device on which the matched data is stored; and acquire the matched data from the third storage device through the device-to-device link.

When the transceiver unit 1401 receives the matched data sent by the first base station, the processing unit 1402 is configured to perform the corresponding processing according to the matched data received by the transceiver unit 1401.

Figure 15:
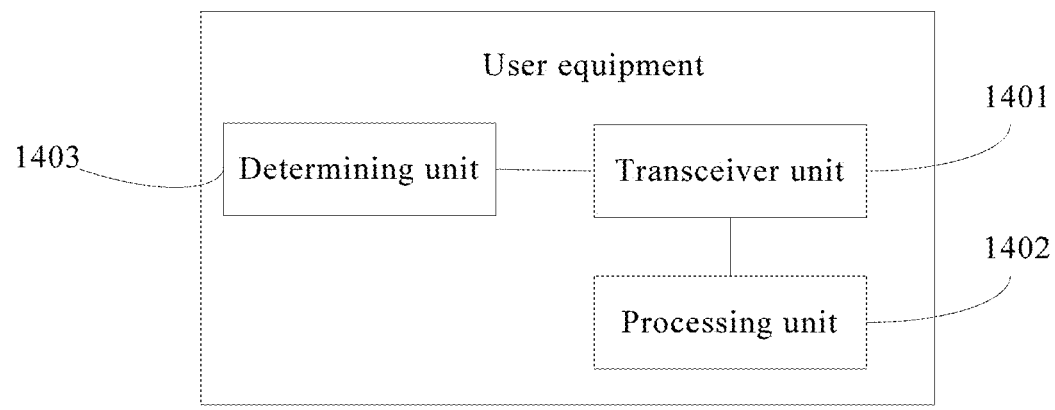
FIG. 15 is a schematic structural diagram of another user equipment according to an embodiment of the present invention.

Further, as shown in FIG. 15, the user equipment includes a determining unit 1403 configured to determine the number of times the request message is sent to the first base station.

The processing unit 1402 is further configured to, when it is determined that the number of times the request message is sent to the first base station is greater than a first threshold, acquire, from a cluster head, a maximum number of copies allowed in copying the matched data in a cluster and the number of times the matched data is already stored in the cluster.

When the cluster head is the first base station, the processing unit 1402 is configured to, when it is determined that the number of times the request message is sent to the first base station is greater than the first threshold, acquire, from the first base station, the maximum number of copies allowed in copying the matched data in the cluster and the number of times the matched data is already stored in the cluster.

The processing unit 1402 is further configured to, when the number of times the matched data is already stored in the cluster is less than the maximum number of copies allowed in copying the matched data in the cluster, store the matched data, and update the number of times the matched data is already stored in the cluster.

The transceiver unit 1401 is further configured to send, to the cluster head, the number of times the matched data is already stored in the cluster, where the number of times is updated by the processing unit 1402, so that the cluster head updates the number of times the matched data is already stored in the cluster.

Further, the transceiver unit 1401 is further configured to send, to the first base station, a radio resource control link establishment request message, so that the first base station establishes a radio resource control link with the user equipment.

Further, the transceiver unit 1401 is further configured to send, to a mobility management entity, a packet data link establishment request message, where the request message carries packet data address information, so that the mobility management entity establishes a bearer link between the user equipment and a packet data network gateway according to the packet data address information carried in the packet data link establishment request message This embodiment of the present invention provides a user equipment. A request message is sent to a first base station, so that the first base station retrieves, after receiving the request message sent by the user equipment, in stored data on the first base station according to identification information, in the request message, of requested data; and if matched data is stored on the first base station, the first base station directly sends the matched data to the user equipment. In this way, data is stored on a base station side, and therefore, when different user equipments served by a base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience. A storage condition of the data information on the base station side is dynamically changed according to a data information requirement of the user equipment, which further improves availability of system storage space.

Figure 16:
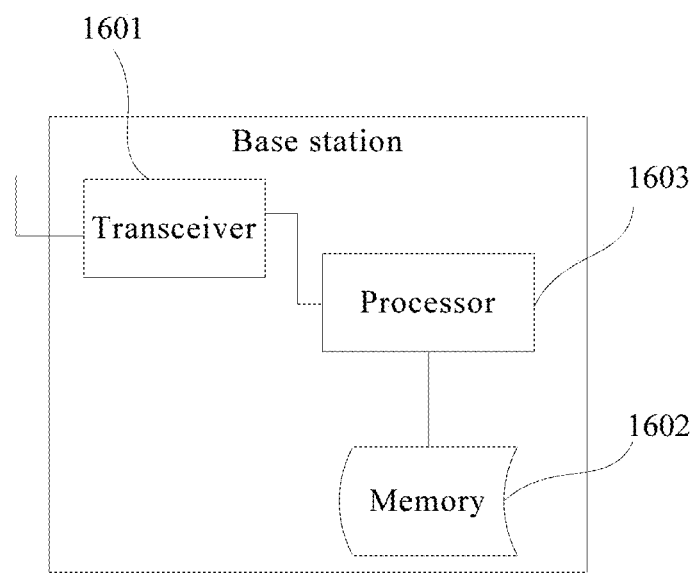
FIG. 16 is a schematic structural diagram of another base station according to an embodiment of the present invention.

As shown in FIG. 16, an embodiment of the present invention provides a base station, including a transceiver 1601, a memory 1602, and a processor 1603 connected to both the transceiver 1601 and the memory 1602. Certainly, the base station may further include general parts such as an antenna, a baseband processing component, an intermediate radio frequency processing component, and an input/output apparatus, and this embodiment of the present invention sets no limitation thereto.

The memory 1602 stores a set of program code, and the processor 1603 is configured to invoke the program code in the memory 1602. Specific implementation processes of the transceiver 1601 and the processor 1603 are as follows.

The transceiver 1601 is configured to receive a request message sent by a first device.

The request message carries identification information of requested data and identification information of the first device. The first device includes a user equipment or a second base station.

The processor 1603 is configured to retrieve in stored data according to the identification information, in the request message received by the transceiver 1601, of the requested data.

The processor 1603 is further configured to, when matched data is retrieved, trigger the transceiver 1601 to send the matched data to the first device according to the identification information of the first device.

The matched data refers to data that matches the identification information of the requested data.

The processor 1603 is configured to, when the transceiver 1601 receives the request message sent by the user equipment, when the matched data is retrieved by the processor

1603, trigger the transceiver 1601 to send the matched data to the user equipment; and when the transceiver 1601 receives a request message sent by a second base station, when the matched data is retrieved by the processor 1603, send the matched data to the second base station.

Further, the processor 1603 is further configured to, when no matched data is retrieved and the base station is not a cluster head, trigger the transceiver 1601 to send the request message to a packet data network gateway through a mobility management entity, so that the packet data network gateway sends the request message to a third base station used as a cluster head, and the third base station determines, according to the identification information of the requested data, a first storage device on which the matched data is stored, and sends identification information of the first storage device to the first base station.

The transceiver 1601 is further configured to receive the identification information of the first storage device.

The transceiver 1601 is further configured to send the request message to the first storage device according to the identification information of the first storage device, so that the first storage device sends, after receiving the request message, the stored matched data that matches the identification information, in the request message, of the requested data to the base station.

The transceiver 1601 is further configured to receive the matched data sent by the first storage device, and send the matched data to the first device.

Further, the processor 1603 is further configured to, when no matched data is retrieved and the base station is a cluster head, determine, according to the identification information of the requested data, a second storage device on which the matched data is stored, and acquire identification information of the second storage device.

The transceiver 1601 is further configured to send the request message to the second storage device according to the identification information, acquired by the processor 1603, of the second storage device, so that the second storage device acquires the matched data according to the identification information of the requested data and sends the matched data to the base station.

The transceiver 1601 is further configured to receive the matched data sent by the second storage device.

The transceiver 1601 is further configured to send the matched data to the first device.

Alternatively, the processor 1603 is further configured to, when no matched data is retrieved and the base station is a cluster head, determine, according to the identification information that is of the requested data and in the request message, a third storage device on which the matched data that matches the identification information of the requested data is stored, and acquire identification information of the third storage device.

The transceiver 1601 is further configured to send, to the first device, the identification information, acquired by the processor 1603, of the third storage device, so that the first device acquires the matched data from the third storage device according to the identification information of the third storage device.

The processor 1603 is further configured to determine the number of times the request message is received.

The processor 1603 is further configured to, when it is determined that the number of times the request message is received is greater than a first threshold, acquire a maximum number of copies allowed in copying the matched data in a cluster and the number of times the matched data is already stored in the cluster.

Further, the processor 1603 is further configured to, when the base station is not a cluster head, acquire, by using a cluster head, the maximum number of copies allowed in copying the matched data in the cluster and the number of times the matched data is already stored in the cluster.

The processor 1603 is further configured to, when the number of times the matched data is already stored in the cluster is less than the maximum number of copies allowed in copying the matched data in the cluster, store the matched data, and update the number of times the matched data is already stored in the cluster.

Further, the transceiver 1601 is further configured to, when the base station is not a cluster head, send, to the cluster head, the number of times the matched data is already stored in the cluster, where the number is updated by the processor 1603, so that the cluster head updates the number of times the matched data is already stored in the cluster.

Further, the processor 1603 is configured to determine whether a size of free storage space is greater than a size of the matched data.

The processor 1603 is further configured to directly store the matched data when it is determined that the size of the free storage space is greater than the size of the matched data; and when it is determined that the size of the free storage space is not greater than the size of the matched data, update the free storage space according to a least recently used algorithm, and store the matched data in the updated free storage space.

The processor 1603 is further configured to, when the base station is a cluster head, monitor a service status of the matched data already stored in a cluster.

The service status includes a service-succeeded state and a service-failed state, where the service-succeeded state refers to that the matched data is sent to the first device, and the service-failed state refers to that the matched data is not sent to the first device.

The processor 1603 is further configured to count the number of service-failed states of the matched data and a total number of received request messages in the cluster according to the service status of the matched data.

The processor 1603 is further configured to compare the counted number of service-failed states of the matched data with the total number of received request messages in the cluster.

The processor 1603 is configured to update, according to a determined comparison result, the maximum number of copies allowed in copying the matched data.

The processor 1603 is configured to, when the comparison result is greater than the second threshold, increase the maximum number of copies allowed in copying the matched data; or when the comparison result is less than a third threshold, decrease the maximum number of copies allowed in copying the matched data.

Further, the transceiver 1601 is further configured to receive a radio resource control link establishment request message sent by the user equipment.

The processor 1603 is further configured to establish a radio resource control link with the user equipment according to the radio resource control link establishment request message received by the transceiver 1601.

This embodiment of the present invention provides a base station. After a request message sent by a first device is received, stored data is retrieved according to identification information, in the request message, of requested data; and if matched data exists on the base station, the base station directly sends the matched data to the first device. In this way, data is stored on a base station side, and therefore, when different user equipments served by the base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience. A storage condition of the data information on the base station side is dynamically changed according to a data information requirement of the user equipment, which further improves availability of system storage space.

Figure 17:
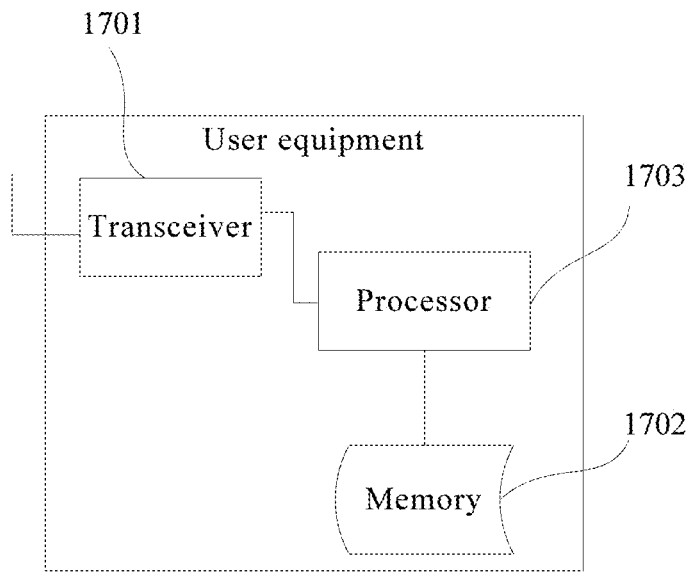
FIG. 17 is a schematic structural diagram of another user equipment according to an embodiment of the present invention.

As shown in FIG. 17, an embodiment of the present invention provides a user equipment, including a transceiver 1701, a memory 1702, and a processor 1703 connected to both the transceiver 1701 and the memory 1702. Certainly, the user equipment may include other general parts, and this embodiment of the present invention sets no limitation thereto.

The memory 1702 stores a set of program code, and the processor 1703 is configured to invoke the program code in the memory 1702. The processor 1703 and the transceiver 1701 are configured to perform the following operations.

The transceiver 1701 is configured to send a request message to a first base station.

The request message carries identification information of requested data and identification information of the user equipment, so that the first base station retrieves in stored data on the first base station according to the identification information of the requested data; and if matched data is stored on and retrieved from the first base station, the first base station directly sends the matched data to the user equipment.

The matched data refers to data that matches the identification information of the requested data.

The transceiver 1701 is further configured to receive a response message sent by the first base station in response to the request message.

The response message includes the matched data.

The transceiver 1701 is configured to receive the matched data sent by the first base station.

Alternatively, the response message includes identification information of a third storage device on which the matched data is stored.

The transceiver 1701 is configured to receive the identification information, sent by the first base station, of the third storage device on which the matched data is stored.

The processor 1703 is configured to perform corresponding processing according to the response message received by the transceiver 1701.

When the transceiver 1701 receives the identification information, sent by the first base station, of the third storage device on which the matched data is stored, the processor 1703 is configured to acquire the matched data from the third storage device according to the received identification information of the third storage device on which the matched data is stored.

The processor 1703 is configured to establish a device-to-device link with the third storage device according to the identification information, received by the transceiver 1701, of the third storage device on which the matched data is stored; and acquire the matched data from the third storage device through the device-to-device link.

When the transceiver 1701 receives the matched data sent by the first base station, the processor 1703 is configured to perform the corresponding processing according to the matched data received by the transceiver 1701.

The processor 1703 is further configured to determine the number of times the request message is sent to the first base station.

The processor 1703 is further configured to, when it is determined that the number of times the request message is sent to the first base station is greater than a first threshold, acquire, from a cluster head, a maximum number of copies allowed in copying the matched data in a cluster and the number of times the matched data is already stored in the cluster.

When the cluster head is the first base station, the processor 1703 is configured to, when it is determined that the number of times the request message is sent to the first base station is greater than the first threshold, acquire, from the first base station, the maximum number of copies allowed in copying the matched data in the cluster and the number of times the matched data is already stored in the cluster.

The processor 1703 is further configured to, when the number of times the matched data is already stored in the cluster is less than the maximum number of copies allowed in copying the matched data in the cluster, store the matched data, and update the number of times the matched data is already stored in the cluster.

The transceiver 1701 is further configured to send, to the cluster head, the number of times the matched data is already stored in the cluster, where the number of times is updated by the processor 1703, so that the cluster head updates the number of times the matched data is already stored in the cluster.

Further, the transceiver 1701 is further configured to send, to the first base station, a radio resource control RRC link establishment request message, so that the first base station establishes an RRC radio resource control link with the user equipment UE.

Further, the transceiver 1701 is further configured to send, to a mobility management entity, a packet data link establishment request message, where the request message carries packet data address information, so that the mobility management entity establishes a bearer link between the user equipment and a packet data network gateway according to the packet data address information carried in the packet data link establishment request message.

This embodiment of the present invention provides a user equipment. A request message is sent to a first base station, so that the first base station retrieves, after receiving the request message sent by the user equipment, in stored data on the first base station according to identification information, in the request message, of requested data; and if matched data is stored on the first base station, the first base station directly sends the matched data to the user equipment. In this way, data is stored on a base station side, and therefore, when different user equipments served by a base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience. A storage condition of the data information on the base station side is dynamically changed according to a data information requirement of the user equipment, which further improves availability of system storage space.

Figure 18:
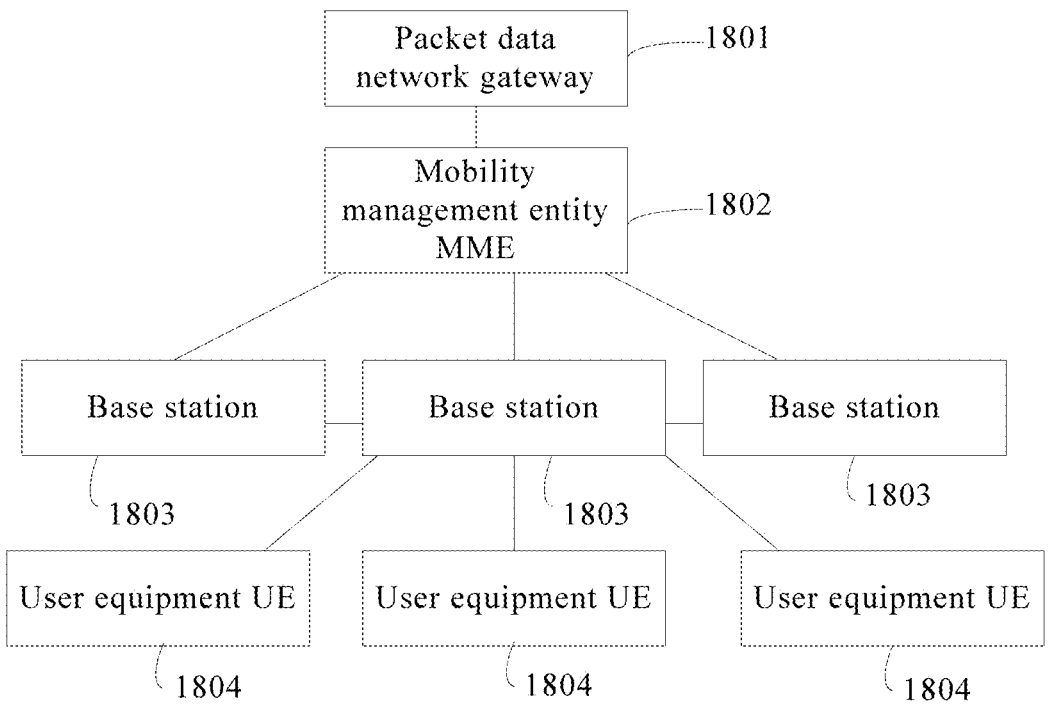
FIG. 18 is a schematic structural diagram of a data transmission system according to an embodiment of the present invention.

As shown in FIG. 18, an embodiment of the present invention provides a data transmission system, including an MME 1802, a packet data network gateway 1801, at least one base station 1803, and at least one user equipment 1804. The base station 1803 is the base station described in the foregoing embodiment; and the user equipment 1804 is the user equipment described in the foregoing embodiment.

Embodiments of the present invention provide a data transmission method, apparatus, and system. After receiving a request message sent by a first device, a base station retrieves in stored data according to identification information, in the request message, of requested data; and if matched data exists on the first base station, the base station directly sends the matched data to the first device. In this way, data is stored on a base station side, and therefore, when different user equipments served by the base station request same data, the base station may send matched data to the different user equipments, and it is unnecessary to send a request message to a network side and it is unnecessary for the network side to establish multiple same links for sending same data information to the different user equipments, thereby reducing core network bandwidth resources occupied by data transmission. In addition, the data is directly sent from the base station side to the user equipment, which reduces waiting time of the user equipment and improves user experience. A storage condition of the data information on the base station side is dynamically changed according to a data information requirement of the user equipment, which further improves availability of system storage space.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

An embodiment of the present invention provides a data transmission method, comprising sending, by a user equipment, a request message to a first base station, wherein the request message carries identification information of requested data and identification information of the user equipment, so that the first base station retrieves in stored data on the first base station according to the identification information of the requested data; and if matched data is stored on and retrieved from the first base station, directly sending, by the first base station, the matched data to the user equipment, wherein the matched data refers to data that matches the identification information of the requested data; and receiving, by the user equipment, a response message sent by the first base station in response to the request message, and performing corresponding processing according to the response message.

In a first development of the data transmission method according to the embodiment, the response message comprises the matched data; and the receiving, by the user equipment, a response message sent by the first base station in response to the request message, and performing corresponding processing according to the response message comprises receiving, by the user equipment, the matched data sent by the first base station, and performing the corresponding processing according to the matched data.

In a second development of the data transmission method according to the embodiment, the response message in response to the request message comprises identification information of a third storage device on which the matched data is stored; and the receiving, by the user equipment, a response message sent by the first base station in response to the request message, and performing corresponding processing according to the response message comprises receiving, by the user equipment, the identification information, sent by the first base station, of the third storage device on which the matched data is stored; and acquiring, by the user equipment, the matched data from the third storage device according to the identification information of the third storage device.

In a third development of the data transmission method according to the embodiment, after the sending, by a user equipment, a request message to a first base station, the method further comprises determining, by the user equipment, the number of times the request message is sent to the first base station; when it is determined that the number of times the request message is sent to the first base station is greater than a first threshold, acquiring, by the user equipment and from a cluster head, a maximum number of copies allowed in copying the matched data in a cluster and the number of times the matched data is already stored in the cluster; if the number of times the matched data is already stored in the cluster is less than the maximum number of copies allowed in copying the matched data in the cluster, storing, by the user equipment, the matched data, and updating the number of times the matched data is already stored in the cluster; and sending, by the user equipment to the cluster head, the updated number of times the matched data is already stored in the cluster, so that the cluster head updates the number of times the matched data is already stored in the cluster.

An embodiment of the present invention provides a user equipment, comprising a transceiver unit configured to send a request message to a first base station, wherein the request message carries identification information of requested data and identification information of the user equipment, so that the first base station retrieves in stored data on the first base station according to the identification information of the requested data; and if matched data is stored on and retrieved from the first base station, the first base station directly sends the matched data to the user equipment, wherein the matched data refers to data that matches the identification information of the requested data; wherein the transceiver unit is further configured to receive a response message sent by the first base station in response to the request message; and a processing unit configured to perform corresponding processing according to the response message received by the transceiver unit.

In a first development of the user equipment according to the embodiment, the response message comprises the matched data; the transceiver unit is configured to receive the matched data sent by the first base station; and the processing unit is configured to perform the corresponding processing according to the matched data received by the transceiver unit.

In a second development of the user equipment according to the embodiment, the response message comprises identification information of a third storage device on which the matched data is stored; the transceiver unit is configured to receive the identification information, sent by the first base station, of the third storage device on which the matched data is stored; and the processing unit is configured to acquire the matched data from the third storage device according to the identification information, received by the transceiver unit, of the third storage device.

In a third development of the user equipment according to the embodiment, further comprising a determining unit configured to determine the number of times the request message is sent to the first base station; wherein the processing unit is further configured to, when it is determined that the number of times the request message is sent to the first base station is greater than a first threshold, acquire, from a cluster head, a maximum number of copies allowed in copying the matched data in a cluster and the number of times the matched data is already stored in the cluster; the processing unit is further configured to, when the number of times the matched data is already stored in the cluster is less than the maximum number of copies allowed in copying the matched data in the cluster, store the matched data, and update the number of times the matched data is already stored in the cluster; and the transceiver unit is further configured to send, to the cluster head, the number of times the matched data is already stored in the cluster, wherein the number of times is updated by the processing unit, so that the cluster head updates the number of times the matched data is already stored in the cluster.

An embodiment of the present invention provides a data transmission system, comprising a mobility management entity, a packet data network gateway, at least one base station, and at least one user equipment, wherein the base station is the base station according to any one of the above embodiment; and the user equipment is the user equipment according to any one of the above embodiment.

What is claimed is:

1. A data transmission method, comprising:
   receiving, by a first base station, a request message sent by a first device, wherein the request message carries identification information of requested data and identification information of the first device, and wherein the first device comprises a user equipment or a second base station;
   retrieving, by the first base station, in stored data according to the identification information of the requested data;
   sending, by the first base station, the matched data to the first device according to the identification information of the first device when matched data is retrieved, wherein the matched data refers to data that matches the identification information of the requested data;
   when no matched data is retrieved by the first base station and the first base station is not a cluster head, sending, by the first base station, the request message to a packet data network gateway through a mobility management entity such that the packet data network gateway sends the request message to a third base station used as a cluster head, and the third base station determines, according to the identification information of the requested data, a first storage device on which the matched data is stored, and sends identification information of the first storage device to the first base station;
   receiving, by the first base station, the identification information of the first storage device;
   sending, by the first base station, the request message to the first storage device according to the identification information of the first storage device such that the first storage device sends, after receiving the request message, the stored matched data that matches the identification information, in the request message, of the requested data to the first base station;
   receiving, by the first base station, the matched data sent by the first storage device; and
   sending the matched data to the first device.

2. The data transmission method according to claim 1, wherein after receiving, by the first base station, the request message sent by the first device, the method further comprises:
   determining, by the first base station, the number of times the request message is received;
   when it is determined that the number of times the request message is received is greater than a first threshold, acquiring, by the first base station, a maximum number of copies allowed in copying the matched data in a cluster and the number of times the matched data is already stored in the cluster; and
   when the number of times the matched data is already stored in the cluster is less than the maximum number of copies allowed in copying the matched data in the cluster, storing, by the first base station, the matched data, and updating the number of times the matched data is already stored in the cluster.

3. The data transmission method according to claim 2, wherein acquiring, by the first base station, the maximum number of copies allowed in copying the matched data in the cluster and the number of times the matched data is already stored in the cluster comprises:
   when the first base station is not a cluster head, acquiring, by the first base station by using a cluster head, the maximum number of copies allowed in copying the matched data in the cluster and the number of times the matched data is already stored in the cluster, and
   wherein after updating, by the first base station, the number of times the matched data is already stored in the cluster, the method further comprises sending, by the first base station to the cluster head, the updated number of times the matched data is already stored in the cluster such that the cluster head updates the number of times the matched data is already stored in the cluster.

4. The data transmission method according to claim 2, wherein storing, by the first base station, the matched data comprises:
   determining, by the first base station, whether a size of free storage space is greater than a size of the matched data;
   when the size of the free storage space is greater than the size of the matched data, directly storing, by the first base station, the matched data; and
   when the size of the free storage space is not greater than the size of the matched data, updating, by the first base station, the free storage space according to a least recently used algorithm, and storing the matched data in the updated free storage space.

5. A data transmission method comprising:
   receiving, by a first base station, a request message sent by a first device, wherein the request message carries identification information of requested data and identification information of the first device, and wherein the first device comprises a user equipment or a second base station;
   retrieving, by the first base station, in stored data according to the identification information of the requested data;
   sending, by the first base station, the matched data to the first device according to the identification information of the first device when matched data is retrieved, wherein the matched data refers to data that matches the identification information of the requested data;

when no matched data is retrieved by the first base station and the first base station is a cluster head, determining, by the first base station according to the identification information of the requested data, a second storage device on which the matched data is stored, and acquiring identification information of the second storage device;

sending, by the first base station, the request message to the second storage device according to the identification information of the second storage device such that the second storage device acquires the matched data according to the identification information of the requested data and sends the matched data to the first base station;

receiving, by the first base station, the matched data sent by the second storage device; and sending, by the first base station, the matched data to the first device.

6. A data transmission method, comprising:

receiving, by a first base station, a request message sent by a first device, wherein the request message carries identification information of requested data and identification information of the first device, and wherein the first device comprises a user equipment or a second base station;

retrieving, by the first base station, in stored data according to the identification information of the requested data;

sending, by the first base station, the matched data to the first device according to the identification information of the first device when matched data is retrieved, wherein the matched data refers to data that matches the identification information of the requested data;

when no matched data is retrieved by the first base station and the first base station is a cluster head, determining, by the first base station according to the identification information of the requested data, a third storage device on which the matched data that matches the identification information of the requested data is stored, and acquiring identification information of the third storage device; and sending, by the first base station, the identification information of the third storage device to the first device such that the first device acquires the matched data from the third storage device according to the identification information of the third storage device.

7. A data transmission method, comprising:

receiving, by a first base station, a request message sent by a first device, wherein the request message carries identification information of requested data and identification information of the first device, and wherein the first device comprises a user equipment or a second base station;

retrieving, by the first base station, in stored data according to the identification information of the requested data; and sending, by the first base station, the matched data to the first device according to the identification information of the first device when matched data is retrieved, wherein the matched data refers to data that matches the identification information of the requested data, and wherein after receiving, by the first base station, the request message sent by the first device, the method further comprises:

monitoring, by the first base station when the first base station is a cluster head, a service status of the matched data already stored in the cluster, wherein the service status comprises a service-succeeded state and a service-failed state, wherein the service-succeeded state refers to that the matched data is sent to the first device, and the service-failed state refers to that the matched data is not sent to the first device;

counting, by the first base station, the number of service-failed states of the matched data and a total number of received request messages in the cluster according to the service status of the matched data;

comparing, by the first base station, the counted number of service-failed states of the matched data with the total number of received request messages in the cluster, and updating, by the first base station according to a comparison result, the maximum number of copies allowed in copying the matched data.

8. The data transmission method according to claim 7, wherein updating, by the first base station according to the comparison result, the maximum number of copies allowed in copying the matched data comprises:

when the comparison result is greater than a second threshold, increasing, by the first base station, the maximum number of copies allowed in copying the matched data; and when the comparison result is less than a third threshold, decreasing, by the first base station, the maximum number of copies allowed in copying the matched data.

9. A base station, comprising:

a non-transitory computer readable medium having instructions stored thereon; and a computer processor coupled to the non-transitory computer readable medium and configured to execute the instructions to:

receive a request message sent by a first device, wherein the request message carries identification information of requested data and identification information of the first device, and wherein the first device comprises a user equipment or a second base station;

retrieve in stored data according to the identification information of the requested data;

when matched data is retrieved, trigger a transmitter to send, according to the identification information of the first device, the matched data to the first device, wherein the matched data refers to data that matches the identification information of the requested data;

when no matched data is retrieved and the base station is not a cluster head, trigger the transmitter to send the request message to a packet data network gateway through a mobility management entity such that the packet data network gateway sends the request message to a third base station used as a cluster head, and the third base station determines, according to the identification information of the requested data, a first storage device on which the matched data is stored, and sends identification information of the first storage device to the first base station;

receive the identification information of the first storage device, wherein the transmitter is further configured to send the request message to the first storage device according to the identification information of the first storage device such that the first storage device sends, after receiving the request message, the stored matched data that matches the identification information, in the request message, of the requested data to the base station;
receive the matched data sent by the first storage device; and
send the matched data to the first device.

10. The base station according to claim 9, wherein the computer processor is further configured to execute the instructions to:
when no matched data is retrieved and the base station is a cluster head, determine, according to the identification information of the requested data, a third storage device on which the matched data that matches the identification information of the requested data is stored, and acquire identification information of the third storage device; and
send the identification information of the third storage device to the first device such that the first device acquires the matched data from the third storage device according to the identification information of the third storage device.

11. The base station according to claim 9, wherein the computer processor is further configured to execute the instructions to:
determine the number of times the request message is received;
when it is determined that the number of times the request message is received is greater than a first threshold, acquire a maximum number of copies allowed in copying the matched data in a cluster and the number of times the matched data is already stored in the cluster; and
when the number of times the matched data is already stored in the cluster is less than the maximum number of copies allowed in copying the matched data in the cluster, store the matched data, and update the number of times the matched data is already stored in the cluster.

12. The base station according to claim 11, wherein the computer processor is further configured to execute the instructions to:
when the base station is not a cluster head, acquire, by using a cluster head, the maximum number of copies allowed in copying the matched data in the cluster and the number of times the matched data is already stored in the cluster; and
send, to the cluster head, the number of times the matched data is already stored in the cluster, wherein the number of times is updated such that the cluster head updates the number of times the matched data is already stored in the cluster.

13. The base station according to claim 11, wherein the computer processor is further configured to execute the instructions to:
determine whether a size of free storage space is greater than a size of the matched data;
directly store the matched data when determining that the size of the free storage space is greater than the size of the matched data; and
when determining that the size of the free storage space is not greater than the size of the matched data, update the free storage space according to a least recently used algorithm, and store the matched data in the updated free storage space.

14. A base station, comprising:
a non-transitory computer readable medium having instructions stored thereon; and
a computer processor coupled to the non-transitory computer readable medium and configured to execute the instructions to:
receive a request message sent by a first device, wherein the request message carries identification information of requested data and identification information of the first device, and wherein the first device comprises a user equipment or a second base station;
retrieve in stored data according to the identification information of the requested data;
when matched data is retrieved, trigger a transmitter to send, according to the identification information of the first device, the matched data to the first device, wherein the matched data refers to data that matches the identification information of the requested data;
when no matched data is retrieved and the base station is a cluster head, determine, according to the identification information of the requested data, a second storage device on which the matched data is stored, and acquire identification information of the second storage device;
send the request message to the second storage device according to the identification information of the second storage device such that the second storage device acquires the matched data according to the identification information of the requested data and sends the matched data to the base station;
receive the matched data sent by the second storage device; and
send the matched data to the first device.

15. A base station, comprising:
a non-transitory computer readable medium having instructions stored thereon; and
a computer processor coupled to the non-transitory computer readable medium and configured to execute the instructions to:
receive a request message sent by a first device, wherein the request message carries identification information of requested data and identification information of the first device, and wherein the first device comprises a user equipment or a second base station;
retrieve in stored data according to the identification information of the requested data;
when matched data is retrieved, trigger a transmitter to send, according to the identification information of the first device, the matched data to the first device, wherein the matched data refers to data that matches the identification information of the requested data;
when the base station is a cluster head, monitor a service status of the matched data already stored in the cluster, wherein the service status comprises a service-succeeded state and a service-failed state, wherein the service-succeeded state refers to that the matched data is sent to the first device, and wherein the service-failed state refers to that the matched data is not sent to the first device;
count the number of service-failed states of the matched data and a total number of received request messages in the cluster according to the service status of the matched data;
compare the number of service-failed states of the matched data with the total number of received request messages in the cluster, and update, according to a comparison result, the maximum number of copies allowed in copying the matched data.

16. The base station according to claim 15, wherein the computer processor is further configured to execute the instructions to:
increase the maximum number of copies allowed in copying the matched data when the comparison result determined by the comparing unit is greater than a second threshold; and
decrease the maximum number of copies allowed in copying the matched data when the comparison result is less than a third threshold.

* * * * *